(12) United States Patent
Song et al.

(10) Patent No.: US 10,708,648 B2
(45) Date of Patent: Jul. 7, 2020

(54) SYSTEM FOR PROVIDING HYBRID USER INTERFACES AND METHOD THEREOF

(71) Applicant: ALTICAST CORPORATION, Seoul (KR)

(72) Inventors: Moon Kyu Song, Seongnam-si (KR); Woo Hyuck Kim, Hwaseong-si (KR); Hyun Il Jung, Seoul (KR)

(73) Assignee: ALTICAST CORPORATION, Seoul (KR)

( * ) Notice: Subject to any disclaimer, the term of this patent is extended or adjusted under 35 U.S.C. 154(b) by 0 days.

(21) Appl. No.: 15/828,432

(22) Filed: Dec. 1, 2017

(65) Prior Publication Data

US 2018/0160168 A1 Jun. 7, 2018

(30) Foreign Application Priority Data

Dec. 6, 2016 (KR) .................. 10-2016-0164760

(51) Int. Cl.
*H04N 21/239* (2011.01)
*H04N 5/76* (2006.01)
*A63F 13/355* (2014.01)
*H04N 21/431* (2011.01)
*H04N 21/235* (2011.01)
*H04N 21/45* (2011.01)
(Continued)

(52) U.S. Cl.
CPC ......... *H04N 21/4312* (2013.01); *G06F 3/14* (2013.01); *G09G 5/14* (2013.01); *H04N 21/2358* (2013.01); *H04N 21/251* (2013.01); *H04N 21/25825* (2013.01); *H04N 21/25891* (2013.01); *H04N 21/2665* (2013.01); *H04N 21/4516* (2013.01); *H04N 21/6332* (2013.01); *H04N 21/6581* (2013.01); *H04N 21/6582* (2013.01); *H04N 21/8126* (2013.01); *G09G 2350/00* (2013.01); *G09G 2352/00* (2013.01); *G09G 2354/00* (2013.01); *G09G 2370/022* (2013.01); *G09G 2370/027* (2013.01); *H04N 21/2668* (2013.01); *H04N 21/8153* (2013.01); *H04N 21/8545* (2013.01)

(58) Field of Classification Search
None
See application file for complete search history.

(56) References Cited

U.S. PATENT DOCUMENTS 8,843,853 B1 * 9/2014 Smoak .................. G06F 3/0482
715/839
9,807,146 B2 * 10/2017 Song ..................... H04L 67/025
(Continued)

*Primary Examiner* — Nasser M Goodarzi
*Assistant Examiner* — Terrika Peterson

(57) ABSTRACT

Disclosed are a system for providing hybrid user interfaces (UIs) which determines status information according to a subscriber terminal device and a service environment, and a suitable interaction mode corresponding to various content resources and UI resources through analysis of a user profile and provides a service suitable for a user and a situation through a combinative UI resource blended according to the interaction mode, and a method thereof. More particularly, by the system for providing hybrid UIs of the present disclosure and a method thereof, interaction modes corresponding to various content resources and UI resources may be organically combined in each of various set-top boxes and media devices, thereby providing stable and sustainable UIs.

17 Claims, 14 Drawing Sheets

(51) Int. Cl.
*H04N 21/258* (2011.01)
*H04N 21/25* (2011.01)
*H04N 21/6332* (2011.01)
*H04N 21/2665* (2011.01)
*H04N 21/658* (2011.01)
*H04N 21/81* (2011.01)
*G09G 5/14* (2006.01)
*G06F 3/14* (2006.01)
*H04N 21/482* (2011.01)
*H04N 21/8545* (2011.01)
*H04N 21/2668* (2011.01)

(56) References Cited

U.S. PATENT DOCUMENTS

| | | | |
|---|---|---|---|
| 9,912,996 B2 * | 3/2018 | Song | H04N 21/482 |
| 2006/0184968 A1 * | 8/2006 | Clayton | H04N 7/17318 725/56 |
| 2010/0194753 A1 | 8/2010 | Robotham et al. | |
| 2011/0185378 A1 * | 7/2011 | Johnson | H04N 5/44543 725/25 |
| 2011/0295986 A1 * | 12/2011 | Ferris | G06F 9/5072 709/222 |
| 2011/0296460 A1 * | 12/2011 | Jin | H04N 21/2393 725/37 |
| 2013/0091525 A1 | 4/2013 | Yoon et al. | |
| 2015/0256443 A1 * | 9/2015 | Ozawa | H04L 65/80 370/329 |
| 2016/0134910 A1 * | 5/2016 | Davis | H04N 5/76 725/27 |
| 2016/0142784 A1 | 5/2016 | Song et al. | |
| 2016/0293134 A1 * | 10/2016 | Fortin | A63F 13/355 |
| 2017/0094332 A1 * | 3/2017 | Thomas | H04N 21/2543 |
| 2017/0094361 A1 * | 3/2017 | Thomas | H04N 21/4532 |
| 2017/0161319 A1 * | 6/2017 | Venkataraman | G10L 15/22 |
| 2017/0344889 A1 * | 11/2017 | Sengupta | G06F 17/2785 |
| 2018/0095741 A1 * | 4/2018 | Tanabe | G06F 8/61 |

* cited by examiner

FIG. 4A

| | TV viewing time | TV function usage amount | Content purchase |
|---|---|---|---|
| Heavy User | · User having along TV viewing time<br>· User watching limited content<br>· User who subscribed to paid channel and has long viewing time | · Regular channel+paid channel subscription/viewer<br>· Channel watching<br>+VOD purchase/viewer<br>· Channel watching+home menu navigation and content consumer<br>· Channel watching<br>+VOD purchase+additional home menu function use<br>+Companion connection | · Subscribing to "watch TV again (terrestrial)" Genre (user who cannot watch at original broadcast time)<br>· Monthly subscription purchasers<br>· Purchasers of specific genre such as movies/kids/education<br>· Various content purchasers |
| Light User | · User who watches only specific programs at specific time zone<br>· User who rarely watches TV<br>· User who only listens to TV | · Watching TV with channel +/- navigation<br>· Channel watching with mini guide navigation<br>· Channel watching with DCA navigation (cognitive status of a channel being watched) | · User with no VOD purchase<br>· Purchasing only free content<br>· Purchase by point payment |

FIG. 4B

| | TV viewing time | TV function usage amount | Content purchase |
|---|---|---|---|
| Heavy User | · User having along TV viewing time<br>· User watching limited content<br>· User who subscribed to paid channel and has long viewing time | · Regular channel+paid channel subscription/viewer<br>· Channel watching<br>+VOD purchase/viewer<br>· Channel watching+home menu navigation and content consumer<br>· Channel watching<br>+VOD purchase+additional home menu function use+Companion connection | · Subscribing to "watch TV again (terrestrial)" Genre (user who cannot watch at original broadcast time)<br>· Monthly subscription purchasers<br>· Purchasers of specific genre such as movies/kids/education<br>· Various content purchasers |
| Light User | · User who watches only specific programs at specific time zone<br>· User who rarely watches TV<br>· User who only listens to TV | · Watching TV with channel +/- navigation<br>· Channel watching with mini guide navigation<br>· Channel watching with DCA navigation (cognitive status of a channel being watched) | · User with no VOD purchase<br>· Purchasing only free content<br>· Purchase by point payment |

SYSTEM FOR PROVIDING HYBRID USER INTERFACES AND METHOD THEREOF

CROSS-REFERENCE TO RELATED APPLICATION

This application claims priority under 35 U.S.C 119(a) to Korean Patent Application No. 10-2016-0164760, filed on Dec. 6, 2016 in the Korean Intellectual Property Office, the disclosure of which is incorporated herein by reference.

BACKGROUND OF THE DISCLOSURE

Field of the Disclosure

The present disclosure relates to a system for providing hybrid user interfaces (UIs) enabling a subscriber terminal device to render at least one of a content resource and a UI resource according to a combinative UI resource and a control command generated by organic combination of interaction modes received from a remote application server, and a method thereof.

Description of the Related Art

The current broadcasting environment including technology development trends and business trends of pay-TV broadcasters is changing to an Internet-based environment or a hybrid type partially combined with an Internet-based environment.

In addition, consumption patterns for media have diversified due to the emergence of various smart access devices and new advanced technologies, such HTML5 and UHD, have emerged. Accordingly, there are capital requirements such as purchase of a high-performance Set-Top Box (STB), reorganization of User Interface (UI)/User Experience (UX), development of new services, and upgrade of a head-end system. Such capital requirements are a burden on pay-TV broadcasters.

Pay-TV broadcasters are constantly trying to develop technologies to meet changing trends so as to have a competitive edge over existing pay-TV broadcasters or new media operators such as Over-The-Top (OTT) operators, Google TV, and Apple TV.

Accordingly, pay-TV broadcasters are replacing their existing set-top boxes with high-performance models, adding Internet-based services, and analyzing various viewer needs to add recommendation, search, and personalization functions, are applying multi-screen technology that enables media consumption in various devices, and are investing in photography, editing, encoder, and network equipment to provide UHD-quality video beyond HD.

However, it is difficult to simultaneously replace existing head-end systems and set-top boxes that have been made through large-scale investment, either in financial terms or in terms of time. That is, it took considerable time and cost for the existing broadcasting system to provide real-time broadcast, VoD, and other interactive services, and it is costly to develop a service that can meet customer's demands.

There is a need for a technology capable of solving the problems faced by pay broadcasting companies, breaking away from the existing one-way broadcasting environment, and providing consistent UI/UX to various set-top boxes and media devices utilizing the advantages of the two-way broadcasting environment. In addition, there is a need for a technology capable of providing Internet-based services (social networking, recommendation, search, personalization) and facilitating complex UI/UX change and test for each set-top box model.

According to such need, technologies capable of providing UIs from a cloud-based server to a subscriber device have been proposed. However, due to the nature of a computing process of the cloud-based server, problems such as increased bandwidth and server load for processing have occurred.

In addition, since the existing cloud-based server provides a user interface to a subscriber unit using one mode of a control command manner, an image transmission manner, and a streaming manner, there are problems in providing appropriate services according to various content resources and UI resources to users.

RELATED ART DOCUMENTS

Patent Documents

US Patent Application Publication No. 2011/0296460 entitled "METHOD AND APPARATUS FOR PROVIDING REMOTE USER INTERFACE (UI) SERVICE," published on Dec. 1, 2011.

US Patent Application Publication No. 2013/0091525 entitled "METHOD AND APPARATUS FOR PROVIDING CLOUD-BASED USER MENU," published on Apr. 11, 2013).

SUMMARY OF THE DISCLOSURE

Therefore, the present invention has been made in view of the above problems, and it is one object of the present invention to provide a system for providing hybrid UIs allowing cost reduction in developing an application directly related to introduction of a new services or service experience of customers, due to reception of a content resource and a UI resource to a subscriber terminal device from a storage separated from a remote application server according to a control command of the remote application server and rendering of the content resource and the UI resource, and a method of providing the hybrid UIs.

It is another object of the present invention to provide a system for providing hybrid UIs capable of flexibly corresponding according to an environment by organically combining status information according to a subscriber terminal device and a service environment in a remote application server and suitable interaction modes corresponding to various content resources and UI resources through analysis of a user profile and thus providing stable and sustainable UIs, and a method of providing the hybrid UIs.

It is another object of the present invention to provide a system for providing hybrid UIs capable of saving a resource through real-time traffic management and redistribution by determining a suitable interaction mode according to an environment in a remote application server and providing a combinative UI resource that is formed by blending at least one of a consequent content resource and UI resource, and a method of providing the hybrid UIs.

It is another object of the present invention to provide a system for providing hybrid UIs capable of providing real-time monitoring correspondence according to UIs based on status information collected from a subscriber terminal device and a user profile in a remote application server, and a method of providing the hybrid UIs.

It is another object of the present invention to provide a system for providing hybrid UIs which provides a combinative UI resource blended according to an interaction mode determined based on a specification of a subscriber terminal device in a remote application server to significantly reduce a load of the subscriber terminal device, and a method of providing the hybrid UIs.

It is another object of the present invention to provide a system for providing hybrid UIs which provides consistent UIs to a subscriber device without development, porting, and testing of applications for different STB types having different specifications to allow rapid service launch and increased customer satisfaction, and a method of providing the hybrid UIs.

It is yet another object of the present invention to provide a system for providing hybrid UIs which provides UIs capable of being implemented even in a low-performance subscriber terminal device to reduce subscriber terminal device purchase cost and service development cost, and a method of providing the hybrid UIs.

In accordance with an aspect of the present invention, the above and other objects can be accomplished by the provision of a remote application server including a status information collector configured to collect status information on at least one of a subscriber terminal device and a service environment; a service inferring processor configured to analyze a user profile to infer a user's customization service; an interaction mode determining processor configured to determine an interaction mode for provision of at least one of a control command, a content resource, and a UI resource to the subscriber terminal device based on at least one of the collected status information and the inferred customization service; and a controller configured to control generation of the control command for a transmission request of at least one of the content resource and the UI resource to a media storage based on the determined interaction mode and transmission of a combinative UI resource formed by blending at least one of a content resource and a UI resource to the subscriber terminal device.

The service inferring processor may analyze the user profile including at least one of a viewing time of a user, a function usage time, and a content usage history to combine a plurality of suitable services and infer the customization service, and the interaction mode determining processor may determine provision of the combinative UI resource based on the inferred customization service.

The customization service may be formed by combining a plurality of services, classified according into levels, for the viewing time, the function usage time, and the content usage history.

The subscriber terminal device may receive the combinative UI resource from the remote application server to perform rendering, and may perform a request of at least one of the content resource and the UI resource to the media storage in correspondence with the received control command to perform rendering of the received content resource and UI resource.

The controller may control a streaming-based combinative UI resource to be streamed to the subscriber terminal device based on the determined interaction mode.

The streaming-based combinative UI resource may be formed by blending at least one of the content resource and the UI resource, and the controller may encode the streaming-based combinative UI resource and controls the encoded streaming-based combinative UI resource to be streamed to the subscriber terminal device. In addition, the subscriber terminal device may decode the streamed combinative UI resource and performs rendering.

The controller may control transmission of an image-based combinative UI resource based on the determined interaction mode. In addition, the subscriber terminal device may receive the image-based combinative UI resource to perform rendering.

The controller may divide a screen into a plurality of regions based on the collected status information, and may control transmission of the combinative UI resource blended based on the determined interaction mode corresponding to each of the divided regions.

The interaction mode determining processor may collect a change in at least one of the status information and the inferred customization service to determine the interaction mode, and the controller may switch the interaction mode from the determination result of each of the divided regions, and control transmission of the combinative UI resource blended based on the switched interaction mode. In addition, the subscriber terminal device may receive the blended combinative UI resource based on the switched interaction mode to perform rendering in correspondence with the regions.

The status information includes processing capability information on at least one of decoding of the subscriber terminal device, screen format configuration, and overlay processing of image data. In addition, the status information may include at least one of resolution information on a display device interworking with the subscriber terminal device, display screen rotation information, device information on an input device interworking with the subscriber terminal device, and service subscription information, and the subscriber terminal device may generate the status information in correspondence with a status information request received from the status information collector to transmit the generated status information to the status information collector.

In accordance with another aspect of the present invention, there is provided a subscriber terminal device including a status information generator configured to generate status information in correspondence with a status information request received from a remote application server; a resource receiver configured to request at least one of a content resource and a UI resource to a media storage based on the control command received from the remote application server, and receive at least one of a content resource and a UI resource in correspondence with the request; and a renderer configured to perform rendering of a combinative UI resource formed by blending at least one of the received content resource and UI resource and at least one of a content resource and a UI resource based on an interaction mode received from the remote application server.

In addition, the subscriber terminal device may further include a terminal device controller configured to control a request of at least one of the content resource and the UI resource to the media storage based on the control command received from the remote application server.

The terminal device controller may control such that at least one of the blended combinative UI resource and the content resource and UI resource received from the media storage is rendered in correspondence with a screen divided into a plurality of regions.

The status information generator may generate the status information corresponding to a user input received through an input device.

In accordance with another aspect of the present invention, there is provided a method of providing hybrid user interfaces, the method including collecting status information on at least one of a subscriber terminal device and a service environment; analyzing a user profile to infer a user's customization service; determining an interaction mode for provision of at least one of a control command, a content resource, and a UI resource to the subscriber terminal device based on at least one of the collected status information and the inferred customization service; and controlling generation of the control command for a transmission request of at least one of the content resource and the UI resource to a media storage based on the determined interaction mode, and controlling transmission of a combinative UI resource formed by blending at least one of a content resource and a UI resource to the subscriber terminal device.

In accordance with yet another aspect of the present invention, there is provided a method of providing hybrid user interfaces, the method including generating status information in correspondence with a status information request received from a remote application server, sending a request for at least one a content resource and a UI resource to a media storage based on a control command received from the remote application server and receiving at least one of a content resource and a UI resource in correspondence with the request, and rendering a combinative UI resource formed by blending at least one of the received content resource and UI resource and at least one of a content resource and a UI resource based on an interaction mode received from and the remote application server.

BRIEF DESCRIPTION OF THE DRAWINGS

The above and other objects, features and other advantages of the present disclosure will be more clearly understood from the following detailed description taken in conjunction with the accompanying drawings, in which:

FIGS. 4A to 4C illustrate examples of a service inferring processor according to an embodiment of the present disclosure;

DETAILED DESCRIPTION OF THE DISCLOSURE

Hereinafter, embodiments of the present invention are described with reference to the accompanying drawings and the description thereof but are not limited thereto.

The terminology used in the present disclosure serves the purpose of describing particular embodiments only and is not intended to limit the disclosure. As used in the disclosure and the appended claims, the singular forms "a", "an" and "the" are intended to include the plural forms as well, unless context clearly indicates otherwise. It will be further understood that the terms "comprises" and/or "comprising," when used in this specification, specify the presence of stated constituents, steps, operations, and/or devices, but do not preclude the presence or addition of one or more other constituents, steps, operations, and/or devices.

It should not be understood that arbitrary aspects or designs disclosed in "embodiments", "examples", "aspects", etc. used in the specification are more satisfactory or advantageous than other aspects or designs.

In addition, the expression "or" means "inclusive or" rather than "exclusive or". That is, unless otherwise mentioned or clearly inferred from context, the expression "x uses a or b" means any one of natural inclusive permutations.

In addition, as used in the description of the invention and the appended claims, the singular forms "a", "an" and "the" are intended to include the plural forms as well, unless context clearly indicates otherwise.

Further, terms such as "first" and "second" are used herein merely to describe a variety of constituent elements, but the constituent elements are not limited by the terms. The terms are used only for the purpose of distinguishing one constituent element from another constituent element.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Meanwhile, in the following description of the present invention, a detailed description of known functions and configurations incorporated herein will be omitted when it may make the subject matter of the present invention unclear. The terms used in the specification are defined in consideration of functions used in the present invention, and can be changed according to the intent or conventionally used methods of clients, operators, and users. Accordingly, definitions of the terms should be understood on the basis of the entire description of the present specification.

Figure 1:
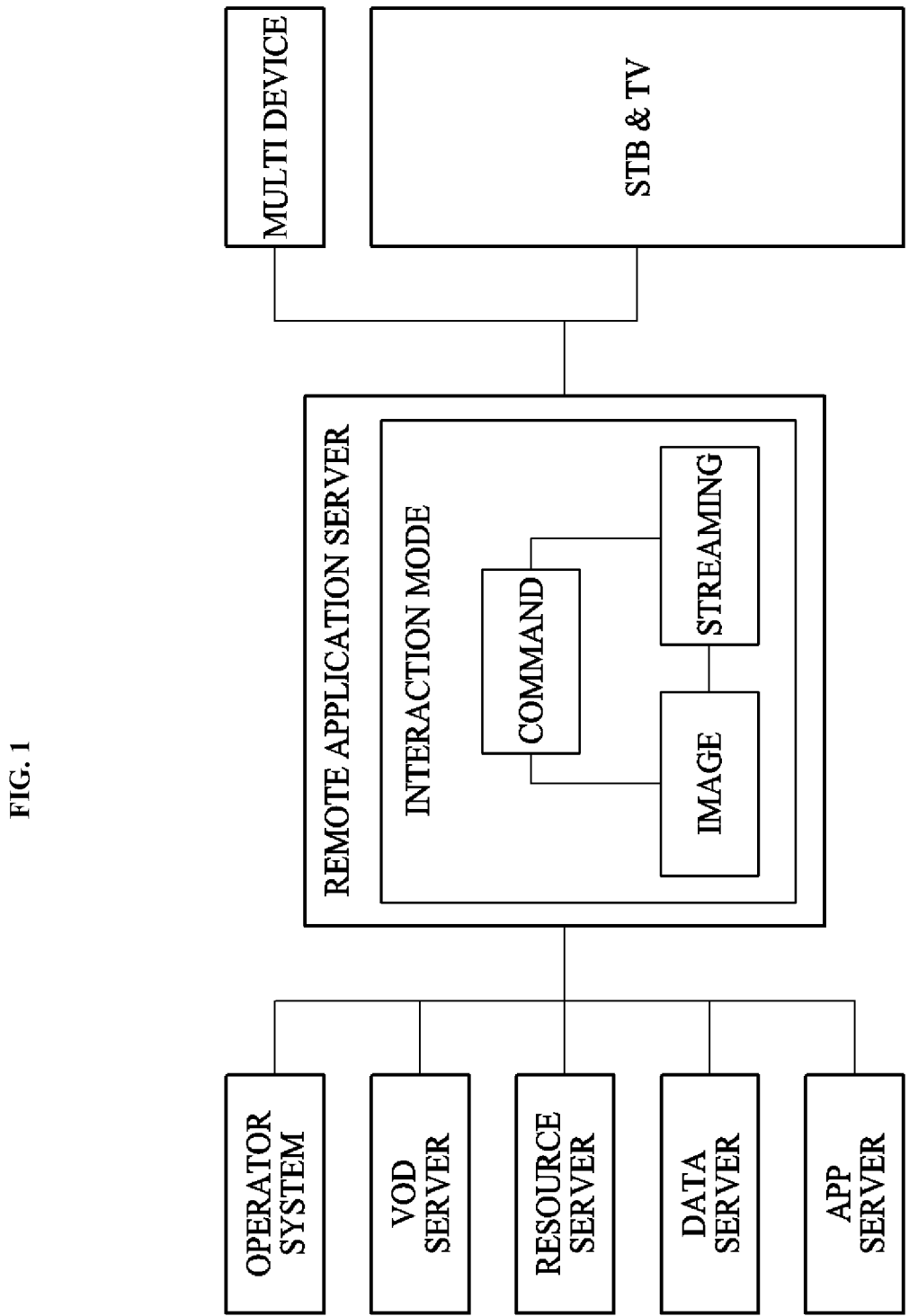
FIG. 1 illustrates a configuration of the hybrid UI system according to an embodiment of the present disclosure.

FIG. 1 illustrates a configuration of the hybrid UI system according to an embodiment of the present disclosure.

Referring to FIG. 1, the hybrid UI system according to an embodiment of the present disclosure includes a remote application server for providing UIs suitable for each user and situation to a subscriber terminal device (multifunctional device, set-top box (STB), TV, or the like).

More particularly, the remote application server according to an embodiment of the present disclosure determines an interaction mode for an organic combination of at least one of a control command, an image, and streaming based on any one of status information collected from a subscriber terminal device and an inferred customization service to provide at least one of a content resource and a UI resource.

For example, the remote application server according to an embodiment of the present disclosure collects status information including information on processing capabilities and specifications from at least one of a multifunctional device, an STB, and TV, and collects service environment information in a process of collecting the status information. In addition, the remote application server according to an embodiment of the present disclosure analyzes a user profile to infer a user's customization service.

Subsequently, the remote application server according to an embodiment of the present disclosure organically combines an interaction mode of at least one of a control command, image data, and streaming based on the collected status information and user profile information, and receives a content resource and UI resource according to the combined interaction mode from an external storage of at least one of an operation system, a VOD server, a resource server, a data server, and an application (APP) server to generate a blended combinative UI resource and transmit the generated UI resource to a subscriber terminal device.

Here, the subscriber terminal device may be a multifunctional device including at least one of a PC, a smartphone, and a tablet PC. Alternatively, the subscriber terminal device may be at least one of a legacy STB, a low profile STB, a high profile STB, a Smart TV, and a USB TV.

Accordingly, the hybrid UI system according to an embodiment of the present disclosure organically combines interaction modes of a control command manner, an image transmission manner, and a streaming transmission manner according to status information on at least one of a subscriber terminal device and a service environment and inferred customization service to provide a combinative UI resource by blending at least one of a content resource and a UI resource suitable for a user and a situation, thereby monitoring different user customization services and situations to provide various high-quality UIs.

Figure 2A:
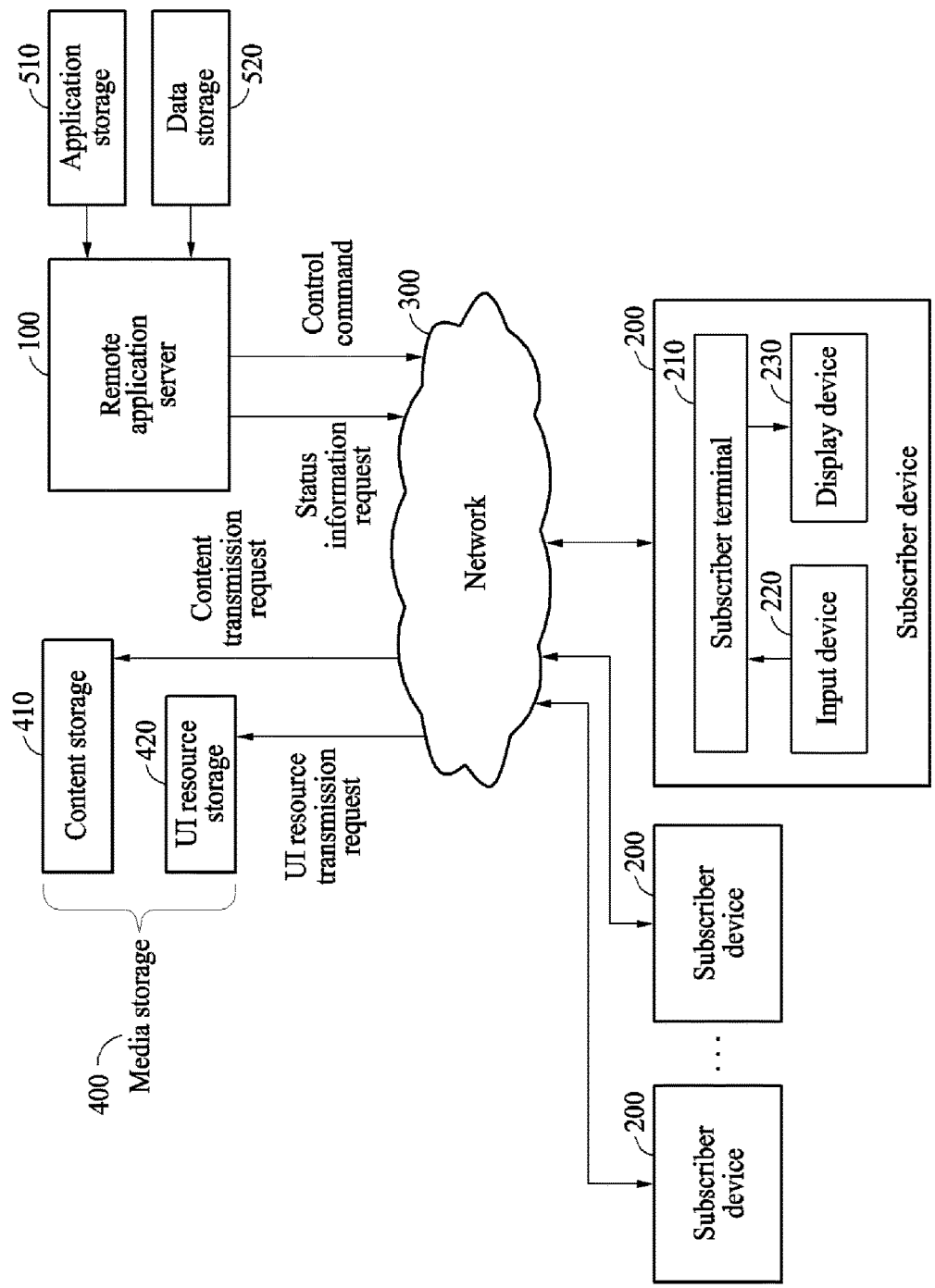
FIGS. 2A and 2B illustrate a system for providing hybrid UIs according to an embodiment of the present disclosure.
Figure 2B:
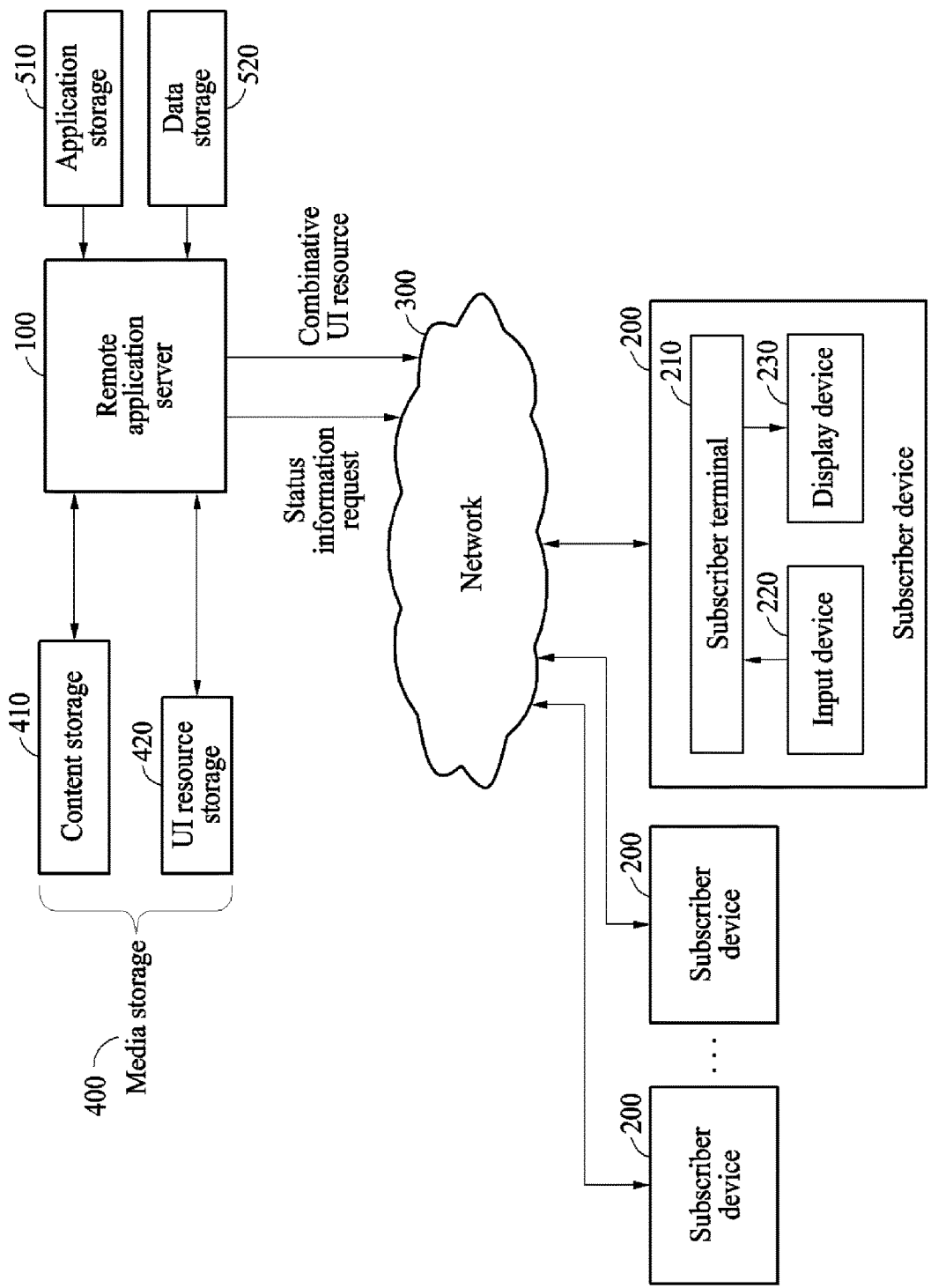

FIGS. 2A and 2B illustrate a system for providing hybrid UIs according to an embodiment of the present disclosure.

More particularly, FIG. 2A illustrates a system for providing hybrid UIs based on a control command according to an embodiment of the present disclosure, and FIG. 2B illustrates a system for providing hybrid UIs based on any one of an image transmission manner and a streaming transmission manner according to an embodiment of the present disclosure.

Referring to FIG. 2A, the system for providing hybrid UIs according to an embodiment of the present disclosure includes a remote application server 100 and a subscriber device 200.

The remote application server 100 according to an embodiment of the present disclosure determines an interaction mode for providing a control command based on at least one of status information and inferred customization service, generates a control command based on the determined interaction mode to transmit the generated control command to the subscriber device 200, and controls a subscriber terminal device 210 based on a control command or controls rendering for at least one of a content resource and a UI resource in the subscriber terminal device 210.

In particular, the remote application server 100 collects status information on the subscriber terminal device 210 in the subscriber device 200 and a service environment through the network 300 and analyzes a user profile received from the subscriber terminal device 210 to infer a user's customization service.

Accordingly, the remote application server 100 determines an interaction mode for providing a control command based on at least one of status information and a customization service, and generates a control command for requesting transmission of at least one of a content resource and a UI resource to a media storage based on the determined interaction mode to transmit the control command to the subscriber terminal device 210.

The UI resource may be implemented using at least one of a web page, a bitmap for an application, and a graphic primitive for an application.

The content resource may be implemented by at least one of video content, audio content, a real-time TV broadcast program, on-demand program SNS information, a chat message, a product, and an application.

In addition, the remote application server 100 may generate a control command for controlling a function of the subscriber terminal device 210 per se.

The remote application server 100 transmits the generated control command to the subscriber device 200 through the network 300.

Status information according to an embodiment of the present disclosure may be information associated with the subscriber terminal device 210 enabling the subscriber terminal device 210 to perform a specific function by a control command from the remote application server 100.

For example, the status information may include at least one of resolution information and display screen rotation information of a display device 230 interworking with the subscriber terminal device 210, information on a device such as an input device 220 interworking with the subscriber terminal device 210, and service subscription information.

As another example, the status information may include information on at least one of a decoding capability, screen format configuration, and image data overlay processing capability of the subscriber terminal device 210.

According to an embodiment, the status information is generated from the subscriber terminal device 210 along with session connection information upon session connection between the remote application server 100 and the subscriber terminal device 210 to be transmitted to the remote application server 100, and is generated from the subscriber terminal device 210 in correspondence with user input to be transmitted to the remote application server 100.

The remote application server 100 of the present disclosure may be a head-end system or a cloud-based media provision server, may receive an application for providing a service from an application storage 510, and may receive data, such as subscriber information, media information, or social network-associated information, from the data storage 520.

The subscriber terminal device 210 in the subscriber device 200 performs a function thereof according to a received control command, or receives at least one of a content resource and a UI resource from a content storage 410 and a UI resource storage 420, which are separated from the remote application server 100, through the network 300 to perform rendering.

For example, the subscriber terminal device 210 receives a control command generated based on an interaction mode from the remote application server 100, and requests transmission of media, such as a content resource and a UI resource, to a media storage 400 based on the received control command. The media storage 400 may include the content storage 410 and the UI resource storage 420 depending upon a type or shape of stored media.

In particular, the subscriber terminal device 210 requests transmission of a content to the content storage 410 based on the received control command, requests transmission of a UI resource to the UI resource storage 420 to receive a content resource from the content storage 410, and receives the UI resource from the UI resource storage 420.

Subsequently, the subscriber terminal device 210 performs rendering of at least one of the received content resource and UI resource based on the control command received from the remote application server 100.

According to an embodiment, the subscriber device 200 may request or receive a content resource through a content channel formed with the content storage 410 based on a control command, and may request or receive a UI resource through a UI resource channel formed with the UI resource storage 420.

The UI resource may be implemented using at least one of a web page, a bitmap for an application, and a graphic primitive for an application.

According to an embodiment, the UI resource may include a business service and a user interface receiving input of a user command for controlling the subscriber device 200 from the outside.

The subscriber device 200 may include the subscriber terminal device 210, the input device 220, and the display device 230, and, as illustrated in FIG. 2A, at least one subscriber device 200 may be present.

The subscriber terminal device 210 of the present disclosure may be, without being limited to, an electronic device equipped with a wired/wireless communication module, such as a set-top terminal (STT), a set-top box (STB), a communication terminal, a PC, a mobile communication terminal, a smartphone, a notepad, a PDA, or a tablet PC, or a terminal device capable of connecting to and communicating with at least one of the remote application server 100, the content storage 410 and the UI resource storage 420 through the network 300.

According to an embodiment, the subscriber terminal device 210 may be a terminal device capable of processing a signal, a bandwidth control process, and a graphics processing process.

In particular, the subscriber terminal device 210 may be a terminal device that performs a graphics processing process such as a process of receiving an MPEG-2 transmission stream for a content including video content and audio content, decoding the content, and rendering the decoded content.

In addition, the subscriber terminal device 210 performs rendering of a local UI resource and received media (UI resource and content resource) stored and maintained in the subscriber terminal device 210 to provide a function, such as an Electronic Program Guide (EPG), VOD, or a digital video recorder (DVR), to a user.

The input device 220 may be a device, such as a remote control, a keyboard, or a touchscreen device, capable of receiving input from a user.

The subscriber terminal device 210 may receive an interaction-based user input based on bidirectionality for a content resource and a UI resource rendered and supplied through the display device 230 from the input device 220.

For example, the user input may include various signals such as a stream request, session initialization, and a clickstream.

According to an embodiment, the subscriber terminal device 210 may directly correspond to a user input to perform rendering for a resource, without depending upon a control command from the remote application server 100, according to a type of a user input received through the input device 220.

For example, when a user input is reprocessed in accordance with a resource state provided to a current user, status information transmission to the remote application server 100 may be unnecessary during reprocessing of a resource. That is, the subscriber terminal device 210 may correspond to a user input received through the input device 220 to perform direct processing of a resource.

The display device 230 may be a device providing a visual or auditory content resource or UI resource, such as a television, a computer monitor, a communication monitor, or a smartphone display, to a user.

The content storage 410 may store and maintain content such as video content, audio content, a real-time TV broadcast program, an on-demand program, SNS information, a chat message, a product, and an application.

According to an embodiment, the content storage 410 may store a content resource to which a content resource or specific protocol of a format corresponding to a specific protocol, such as an MPEG-2 transport packet, MPEG-4, or DVB, is not applied.

As another example, the content storage 410 may store content partitioned in a predetermined manner.

In the case of real-time broadcast content, the remote application server 100 may control such that the content storage 410 obtains the broadcast content, partitions the obtained broadcast content in a predetermined manner, and stores the partitioned broadcast content. In this case, the content storage 410 may separately store and manage broadcast schedule information to obtain and store broadcast content.

For example, the remote application server 100 analyzes status information on the subscriber terminal device 210 and, when the analyzed status information is a reception standby state of partitioned and stored broadcast content, the remote application server 100 generates a control command for transmitting the partitioned and stored broadcast content and transmits the partitioned and stored broadcast content to the subscriber terminal device 210.

The subscriber terminal device 210 having received the control command may transmit a transmission request of the broadcast content to the content storage 410 based on the control command, and the content storage 410 may extract at least one content partition suitable for a corresponding request after searching additional data for the partitioned content, may synthesize the extracted at least one content partition to process as user content, and may transmit the processed content to the subscriber terminal device 210.

Here, the content storage 410 may transmit a corresponding content to the subscriber terminal device 210 or another client device (not shown) by downloading or streaming.

In addition, the content storage 410 may store at least one of broadcast content, content partition, and user content in a cloud storage space, and may also continuously provide content such that continuous content playback ('N-screen service') among a plurality of client devices held by a user is possible.

To accomplish this, the remote application server 100 or the content storage 410 may separately store and manage content playback history for each client device.

According to another embodiment, the remote application server 100 may control such that a corresponding content resource and UI resource are differently transmitted from the content storage 410 and the UI resource storage 420 to the at least one subscriber device 200 according to various communication protocols.

That is, the first subscriber device and the second subscriber device may receive a content resource and a UI resource using different protocols.

Referring to FIG. 2B, the system for providing hybrid UIs according to an embodiment of the present disclosure includes a remote application server 100 and a subscriber device 200.

The remote application server 100 according to an embodiment of the present disclosure determines an interaction mode for providing at least one of a content resource and a UI resource based on at least one of status information and inferred customization service, and controls rendering for a combinative UI resource formed by blending at least one of a content resource and a UI resource in a subscriber terminal device 210 based on the determined interaction mode.

In particular, the remote application server 100 collects status information on the subscriber terminal device 210 in the subscriber device 200 and a service environment through a network 300 and analyzes a user profile received from the subscriber terminal device 210 to infer a user's customization service.

Accordingly, the remote application server 100 determines an interaction mode for providing at least one of a content resource and a UI resource based on at least one of status information and a customization service, generates a combinative UI resource formed by blending at least one of a content resource and a UI resource in an image transmission manner or a streaming transmission manner based on the determined interaction mode, and transmits the generated combinative UI resource to the subscriber terminal device 210.

For example, the remote application server 100 receives a content resource received from the content storage 410 and a UI resource received from the UI resource storage 420 based on the determined interaction mode to generate a combinative UI resource blended according to an image transmission manner and a streaming transmission manner, so as to generate a combinative UI resource.

A combinative UI resource according to an image transmission manner may be blended based on an image from the content resource and the UI resource respectively received from the content storage 410 and the UI resource storage 420.

In addition, a combinative UI resource according to a streaming transmission manner may stitch and encode a video frame from the content resource and the UI resource respectively received from the content storage 410 and the UI resource storage 420, and may be blended with a sequence of the encoded video frame on a streaming basis.

Here, the UI resource may be implemented using at least one of a web page, a bitmap for an application, and a graphic primitive for an application.

In addition, the content resource may be implemented by at least one of video content, audio content, a real-time TV broadcast program, on-demand program SNS information, a chat message, a product, and an application.

The remote application server 100 transmits the generated combinative UI resource to the subscriber device 200 through the network 300.

The subscriber terminal device 210 in the subscriber device 200 receives a combinative UI resource, which is formed by blending at least one of a content resource and a UI resource according to an interaction mode determined in the remote application server 100, through the network 300 and performs rendering.

For example, the subscriber terminal device 210 may receive a blended combinative UI resource based on any one interaction mode, which adopts an image transmission manner or a streaming transmission manner, for providing at least one of a content resource and a UI resource based on at least one of status information and a customization service from the remote application server 100, and may perform of rendering a combinative UI resource according to each of screen regions divided into a plurality of regions based on the received combinative UI resource.

Figure 3:
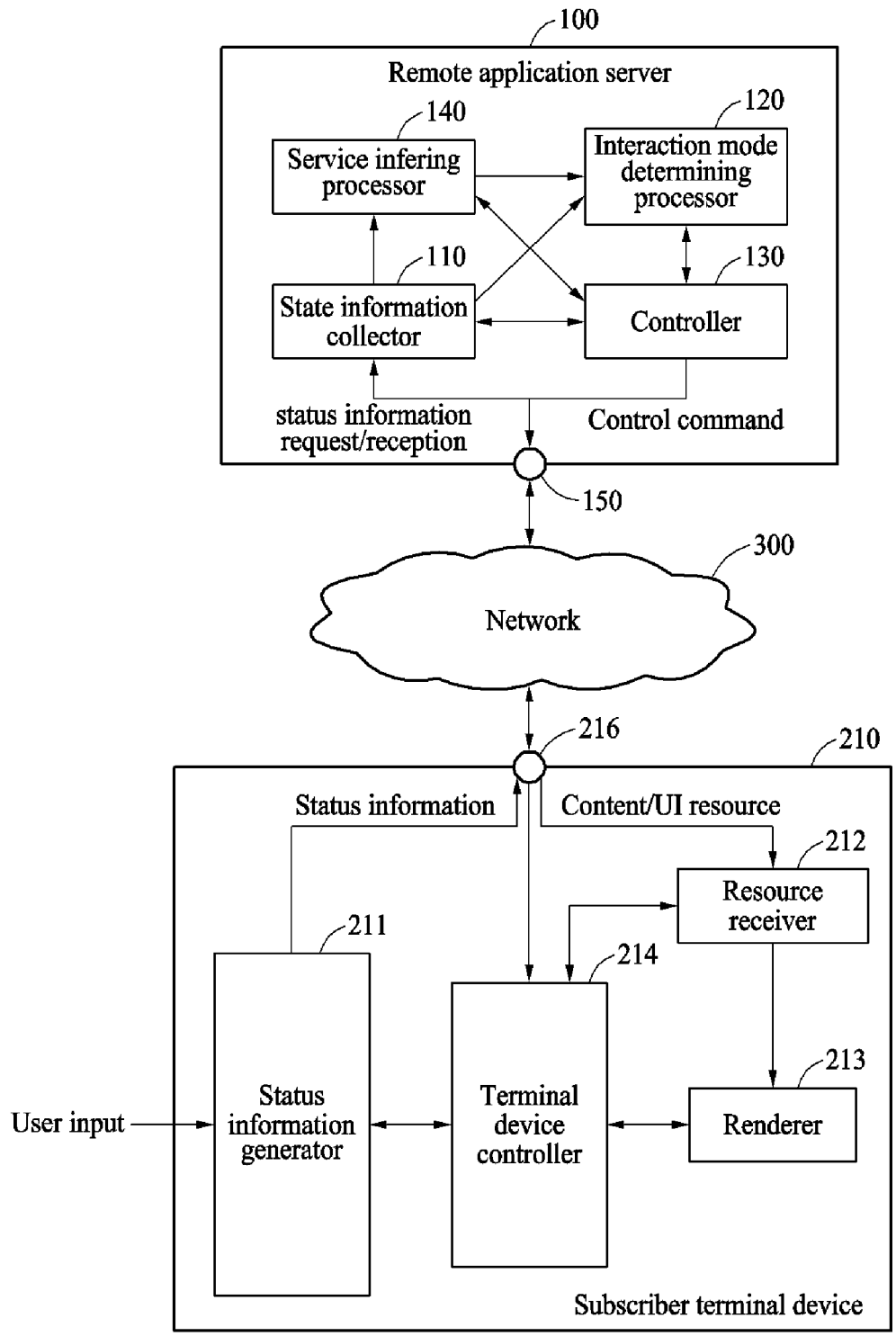
FIG. 3 illustrates configurations of a remote application server and a subscriber terminal device in a system for providing hybrid UIs according to an embodiment of the present disclosure.

FIG. 3 illustrates configurations of a remote application server and a subscriber terminal device in the system for providing hybrid UIs according to an embodiment of the present disclosure.

The remote application server 100 according to an embodiment of the present disclosure collects status information according to the subscriber terminal device 210 and a service environment, analyzes a user profile to infer a user's customization service, and generates a control command according to an interaction mode determined based on the status information and the customization service to transmit the generated control command to the subscriber terminal device 210 or controls transmission of a combinative UI resource formed by blending at least one of a content resource and a UI resource to the subscriber terminal device 210.

To accomplish this, the remote application server 100 includes a status information collector 110, a service inferring processor 140, an interaction mode determining processor 120, and a controller 130.

The status information collector 110 collects status information on at least one of the subscriber terminal device 210 and a service environment.

The status information collector 110 transmits a status information request signal to the subscriber terminal device 210 through the network 300 so as to collect status information on the subscriber terminal device 210, and receives status information from the subscriber terminal device 210 in correspondence with the transmitted status information request signal.

Accordingly, the status information collector 110 may collect status information on a service environment of the network 300 from the status information received from the subscriber terminal device 210.

For example, the status information collector 110 may collect status information on service environments such as network latency and congestion status in a data reception process based on the status information received from the subscriber terminal device 210.

The status information may be information associated with the subscriber terminal device 210 enabling the subscriber terminal device 210 to perform a specific function by a control command from the remote application server 100.

For example, the status information may include at least one of resolution information and display screen rotation information of the display device 230, which is illustrated in FIG. 2, interworking with the subscriber terminal device 210, information on a device such as the input device 220, which is illustrated in FIG. 2, interworking with the subscriber terminal device 210, and service subscription information.

The status information may be generated from the subscriber terminal device 210 along with session connection information upon session connection between the remote application server 100 and the subscriber terminal device 210 to be transmitted to the remote application server 100, and may be generated from the subscriber terminal device 210 in correspondence with a user history to be transmitted to the remote application server 100.

In addition, the status information may include specification information on processing capability for at least one of decoding of the subscriber terminal device 210, screen format configuration, and overlay processing of image data.

In addition, the status information may be information corresponding to a user input received through an input device.

The service inferring processor 140 analyzes a user profile to infer a user's customization service.

The service inferring processor 140 analyzes a user profile including at least one of a viewing time of a user, a function usage time, and a content usage history and combines a plurality of suitable services to infer a customization service.

The customization service may be formed of a combination of a plurality of services, which are classified according into levels, for a viewing time, a function usage time, and a content usage history.

Hereinafter, an embodiment of inferring a customization service through the service inferring processor 140 according to an embodiment of the present disclosure is described in detail with reference to FIGS. 4A to 4C.

Figure 4C:
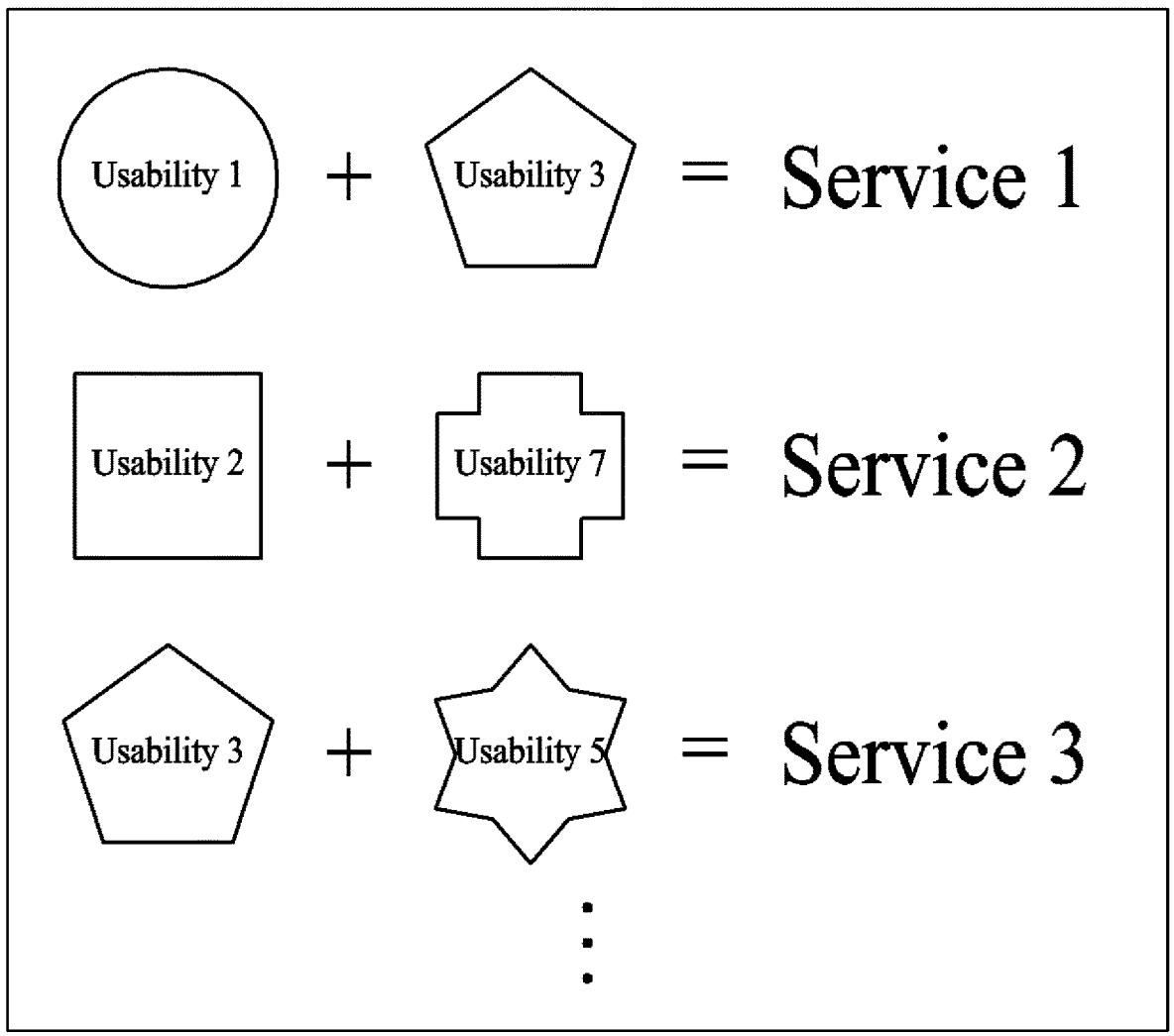

FIGS. 4A to 4C illustrate examples of a service inferring processor according to an embodiment of the present disclosure.

More particularly, FIG. 4A illustrates a table classified into a viewing time, a function usage time, and a content usage history (content purchase), FIG. 4B illustrates an embodiment of analyzing a user profile to select an appropriate services in a table, and FIG. 4C illustrates an embodiment of combining a plurality of selected services to infer a customization service.

Referring to the table of FIG. 4A, users are classified into a heavy user to a light user based on a predetermined level according to each of a TV viewing time, a TV function usage time, and a content usage history.

For example, with regard to the TV viewing time, a heavy user may be any one of a user having a long TV viewing time, a user having limited viewing content, and a user subscribing to paid channels, and a light user may be any one of a user watching only specific programs in a specific time zone, a user rarely watching TV, and a user only listening to TV.

With regard to the TV function usage time, a heavy user may be any one of a user subscribing to regular/paid channels, a user who purchased a channel/VOD, a user using a channel/home menu navigation/content, and a user using a channel/VOD purchase/additional home menu function/companion connection, and a light user may be any one of a user watching TV with only channel navigation, a user watching channels with mini guide navigation and a user who uses channels with DCA navigation (cognitive status of a channel being watched).

With regard to the content usage history, a heavy user may be any one of a user who purchased "watch TV again," a user who purchased monthly subscription, a user who purchased specific genres such as movies/kids/education, and a user who purchased various content, and a light user may be any one of a user who has made no VOD purchase, a user who buy only free content, and a user who purchases by point payment.

However, the present disclosure is not limited to the criteria of a TV viewing time, a TV function usage time, and a content usage history disclosed in the table of FIG. 4A and the preset examples according to the criteria, and the criteria and the examples may be variously changed according to applied embodiments.

Referring to FIG. 4B, the service inferring processor 140 according to an embodiment of the present disclosure analyzes a user profile to select an appropriate services from the preset table.

For example, referring to FIG. 4B, the service inferring processor 140 according to an embodiment of the present disclosure may analyze a user profile to determine a user to be a heavy user in terms of the TV viewing time, a light user in terms of the TV function usage time, and a light user in terms of the content usage history.

Subsequently, referring to FIG. 4C, the service inferring processor 140 according to an embodiment of the present disclosure combines a plurality of services (Usability 1, Usability 2, Usability 3, Usability 5, Usability 7, etc.) selected from each of the TV viewing time, the TV function usage time, and the content usage history to infer appropriate customization services (Service 1, Service 2, Service 3, etc.).

Accordingly, the service inferring processor 140 according to an embodiment of the present disclosure may analyze a user profile received from the subscriber terminal device 210 to infer a customization service for each of a plurality of users.

According to an embodiment, the service inferring processor 140 according to an embodiment of the present disclosure may infer Usabilities 1 and 3 according to each of a long TV viewing time, a TV function usage time used to view channels by mini guide navigation, and a free content usage history in a first subscriber terminal device 210, and may combine the inferred Usabilities 1 and 3 to infer Service 1 suitable for the first subscriber terminal device 210.

According to an embodiment, the service inferring processor 140 according to an embodiment of the present disclosure may infer Usabilities 2 and 7 according to each of a regular TV viewing time due to watching of only specific programs in a specific time zone, a TV function usage time used only for general channels, and a content usage history by point payment in a second subscriber terminal device 210, and may combine the inferred Usabilities 2 and 7 to infer Service 2 suitable for the second subscriber terminal device 210.

According to an embodiment, the service inferring processor 140 according to an embodiment of the present disclosure may infer Usabilities 3 and 5 according to each of a TV viewing time during which a user rarely watches TV, a TV function usage time used in viewing channels by DCA navigation, and a free content usage history in a third subscriber terminal device 210, and may combine the inferred Usabilities 3 and 5 to infer Service 3 suitable for the third subscriber terminal device 210.

For example, when a plurality of users uses the subscriber terminal device 210, the service inferring processor 140 according to an embodiment of the present disclosure may analyze a user profile of each of the users, and may infer and combine a plurality of usabilities corresponding to the analyzed user profile to infer a service suitable for the subscriber terminal device 210.

Accordingly, the subscriber terminal device 210 may provide an appropriate services to each of a plurality of users and, according to an embodiment, a combined service formed by combining appropriate services may be provided to each of a plurality of users using the same subscriber terminal device.

However, examples of a TV viewing time of a user, a TV function usage time, and a content usage history, and a plurality of services are not limited to the aforementioned examples and numbers.

In addition, according to an embodiment, the plurality of services may be customization services for a plurality of users.

Referring to FIG. 3 again, the interaction mode determining processor 120 of the remote application server 100 according to an embodiment of the present disclosure determines an interaction mode to provide at least one of a control command, a content resource, and a UI resource to the subscriber terminal device 210 based on at least one of collected status information and inferred customization service.

The interaction mode determining processor 120 may determine an interaction mode of any one of a control command, an image transmission manner, and a streaming transmission manner to provide at least one of a content resource and a UI resource.

For example, the interaction mode may adopt a control command manner. The interaction mode may adopt a control command manner to control rendering in the subscriber terminal device 210.

According to an embodiment, the interaction mode determining processor 120 adopts a control command manner as an interaction mode to guarantee minimum usability for use of UIs in the subscriber terminal device 210, when processing capability for at least one of decoding, screen format configuration, and overlay processing of image data in the subscriber terminal device 210 might not accept an image transmission manner and a streaming manner or a service environment according to data delay in the network 300 occurs.

As another example, the interaction mode may adopt an image transmission manner. The interaction mode may adopt an image transmission manner for image rendering in the subscriber terminal device 210.

According to an embodiment, the interaction mode determining processor 120 may adopt an image transmission manner as an interaction mode when mosaic viewing and animation streaming of at least one of a content resource and a UI resource in the subscriber terminal device 210 are impossible or consequent network costs are incurred.

As another example, the interaction mode may adopt a streaming transmission manner. The interaction mode may adopt a streaming transmission manner for streaming of a resource in the subscriber terminal device 210.

According to an embodiment, the interaction mode determining processor 120 may use a streaming transmission manner with high processing speed as an interaction mode when processing capability for at least one of decoding, screen format configuration, and overlay processing of image data in the subscriber terminal device 210 accepts all of a control command, an image transmission manner, and a streaming transmission manner.

The interaction mode determining processor 120 determines an interaction mode for providing at least one of a control command, a content resource, and a UI resource to the subscriber terminal device 210 based on at least one of status information and a customization service that are changed in real time, and determines a mode suitable for a specification of the subscriber terminal device 210 to reduce a load of the subscriber terminal device 210, increase a speed, and provide a more accurate resource based on a preset criteria range.

For example, the interaction mode may adopt a control command manner and an image transmission manner based on at least one of status information and a customization service, may adopt a control command manner and a streaming transmission manner, or may adopt an image transmission manner and a streaming transmission manner.

According to an embodiment, the interaction mode may adopt a control command manner, an image transmission manner, or a streaming transmission manner.

That is, the interaction mode may adopt a control command manner, an image transmission manner, or a streaming transmission manner or, according to an embodiment, may adopt two or three manners thereof.

In addition, according to an interaction mode determined based on at least one of status information and a customization service that are changed in real time, the controller 130 may switch an interaction mode according to a determination result, and may control transmission of a combinative UI resource blended based on the switched interaction mode.

The controller 130 controls generation of a control command for requesting transmission of at least one of a content resource and a UI resource to a media storage based on the determined interaction mode, and controls transmission of a combinative UI resource formed by blending at least one of a content resource and a UI resource to the subscriber terminal device 210.

For example, the combinative UI resource may be formed by blending a plurality of content resources or a plurality of UI resources. As another example, the combinative UI resource may be formed by blending a content resource and a UI resource. However, the present disclosure is not limited thereto, and numbers, types, and combination types of the content resource and the UI resource may be variously applied according to an embodiment.

The controller 130 may control a streaming-based combinative UI resource to be streamed to the subscriber terminal device 210 based on the determined interaction mode.

For example, the streaming-based combinative UI resource is a UI resource formed by blending at least one of a content resource and a UI resource, and the controller 130 may encode the streaming-based combinative UI resource and control the encoded streaming-based combinative UI resource to be streamed to the subscriber terminal device 210.

According to an embodiment, the controller 130 may stitch and encode a video frame from at least one of a content resource and a UI resource based on the determined interaction mode using a streaming transmission manner, and may stream a combinative UI resource including a sequence of the encoded video frame to the subscriber terminal device 210. Accordingly, the controller 130 may quickly and continuously transmit a high-capacity combinative UI resource using the interaction mode using a streaming transmission manner.

The controller 130 may control an image-based combinative UI resource to be transmitted to the subscriber terminal device 210 based on the determined interaction mode.

For example, the controller 130 may transmit an image-based combinative UI resource to the subscriber terminal device 210 from at least one of a content resource and a UI resource based on the determined interaction mode using an image transmission manner.

According to an embodiment, the controller 130 may blend an EPG, an application service, etc. based on an image and may control the same to be transmitted to the subscriber terminal device 210.

The controller 130 may divide a screen into a plurality of regions based on collected status information, and may control a combinative UI resource formed by blending at least one of a content resource and a UI resource to be transmitted to the subscriber terminal device 210 based on an interaction mode, which is determined as described above, corresponding to each of the divide regions.

The controller 130 generates a control command for rendering control in the subscriber terminal device 210 with respect to at least one of a content resource and a UI resource based on at least one of collected status information and inferred customization service.

In addition, the controller 130 may generates a control command including at least one of terminal control commands for controlling the subscriber terminal device 210, and transmits the generated control command to the subscriber terminal device 210.

In addition, according to an embodiment, the controller 130 may generate a control command including an image required upon rendering in the subscriber terminal device 210.

In addition, the remote application server 100 according to an embodiment of the present disclosure may further include a transport module 150 forming a signal path with the subscriber terminal device 210 related to status information request, status information reception, transmission of a control command, and transmission of a combinative UI resource.

Preferably, the signal path may form a single path with a transport module 216 of the subscriber terminal device 210.

The remote application server 100 may efficiently control the subscriber terminal device 210 through a signal path of the transport module 150.

For example, the remote application server 100 may effectively control authentication with a local application installed in the subscriber terminal device 210 and the subscriber terminal device 210 through the transport module 150.

The subscriber terminal device 210 according to an embodiment of the present disclosure performs a function of the subscriber terminal device 210 per se according to a control command received from the controller 130, or receives at least one of a content resource and a UI resource from a media storage separated from the remote application server 100 through the network 300 and performs rendering.

The media storage may include a content storage and a UI resource storage depending upon a type or shape of stored media.

In particular, the subscriber terminal device 210 may request transmission of a content resource to a content storage based on the received control command, may request transmission of a UI resource to a UI resource storage to receive the content resource from the content storage, and may receive the UI resource from the UI resource storage.

Subsequently, the subscriber terminal device 210 performs rendering of at least one of a content resource and a UI resource received from a media storage based on a control command received from the controller 130, or performs rendering of a combinative UI resource formed by blending at least one of a content resource and a UI resource based on an interaction mode received from the remote application server 100.

To accomplish this, the subscriber terminal device 210 according to an embodiment of the present disclosure includes a status information generator 211, a resource receiver 212, and a renderer 213.

The status information generator 211 generates status information in correspondence with a status information request received from the remote application server 100.

The status information may include information on a state of waiting for a control command from the remote application server 100 to perform a function of the subscriber terminal device 210 such as a content reception standby state or a state requiring processing of user input.

In addition, the status information may include processing capability information on at least one of decoding of the subscriber terminal device 210, screen format configuration, and overlay processing of image data.

The resource receiver 212 makes a request for at least one of a content resource and a UI resource to a media storage, and receives at least one of the content resource and the UI resource in correspondence with the request.

The UI resource may be implemented using at least one of a web page, a bitmap for an application, and a graphic primitive for an application.

According to an embodiment, the UI resource may include a user interface receiving input of a user command for controlling a business service and the subscriber terminal device 210 from the outside.

The renderer 213 receives at least one of a content resource and a UI resource from the resource receiver 212 and performs rendering.

A media storage including a content storage may store and maintain content such as video content, audio content, a real-time TV broadcast program, an on-demand program, SNS information, a chat message, a product, and an application.

According to an embodiment, the media storage may store content of a format corresponding to a specific protocol such as an MPEG-2 transport packet, MPEG-4, or DVB or content to which a specific protocol is not applied.

As another example, the media storage may store content partitioned in a predetermined manner. When the content is real-time broadcast content, the content storage may obtain broadcast content, may partition the obtained broadcast content in a predetermined manner, and may store the partitioned broadcast content.

In this case, the media storage may separately store and manage broadcast schedule information to obtain and store broadcast content.

In addition, the renderer 213 performs rendering of a combinative UI resource formed by blending at least one of a content resource and a UI resource based on an interaction mode received from the remote application server 100.

The status information collector 110 of the remote application server 100 receives status information from the status information generator 211, receives service environment information in a process of receiving the status information, and analyzes a user profile from the subscriber terminal device 210 to infer a customization service of a user.

The interaction mode determining processor 120 of the remote application server 100 determines an interaction mode in at least one of an image transmission manner and a streaming transmission manner based on at least one of collected status information and inferred customization service, and the controller 130 transmits a combinative UI resource formed by blending at least one of a content resource and a UI resource based on the determined interaction mode to the resource receiver 212.

The renderer 213 having received the combinative UI resource through the resource receiver 212 performs rendering of the combinative UI resource blended based on an interaction mode.

The subscriber terminal device 210 according to an embodiment of the present disclosure may further include a terminal device controller 214 for controlling a request of at least one of a content resource and a UI resource to a media storage based on a control command received from the remote application server 100.

The terminal device controller 214 may transmit a transmission request of broadcast content to a content storage based on a control command, the content storage may search additional data for partitioned content and then extract at least one content partition suitable for a corresponding request, and may synthesize the extracted at least one content partition and process the synthesized content as user content to transmit the processed content to the renderer 213.

Here, the media storage may transmit corresponding content to the subscriber terminal device 210 or another client device (not shown) by downloading or streaming.

In addition, the content storage may store at least one of broadcast content, content partition, and user content in a cloud storage space, and may also continuously provide content such that continuous content playback ('N-screen service') among a plurality of client devices held by a user is possible.

In addition, the terminal device controller 214 may control such that at least one of a blended combinative UI resource received from the remote application server 100, a content resource received from a media storage, and a UI resource is rendered in correspondence with a screen divided into a plurality of regions.

According to an embodiment, the terminal device controller 214 may control such that a combinative resource formed by blending at least one of a content resource and a UI resource is rendered in corresponse with a plurality of regions based on a switched interaction mode in the interaction mode determining processor 120 of the remote application server 100.

In addition, the subscriber terminal device 210 may further include the transport module 216 forming a signal path with the remote application server 100 related to session connection, status information, a resource including a UI resource and content, and a control command. Preferably, the signal path is a single path.

The remote application server 100 may efficiently control the subscriber terminal device 210 through a signal path of the transport module 216.

More particularly, the remote application server 100 may efficiently control a local application installed in the subscriber terminal device 210 through the transport module 216, and may facilitate addition of a service to the subscriber terminal device 210 or change of a service therein.

FIGS. 5A to 5E illustrate examples of a switched interaction mode according to an embodiment of the present disclosure.

Figure 5A:
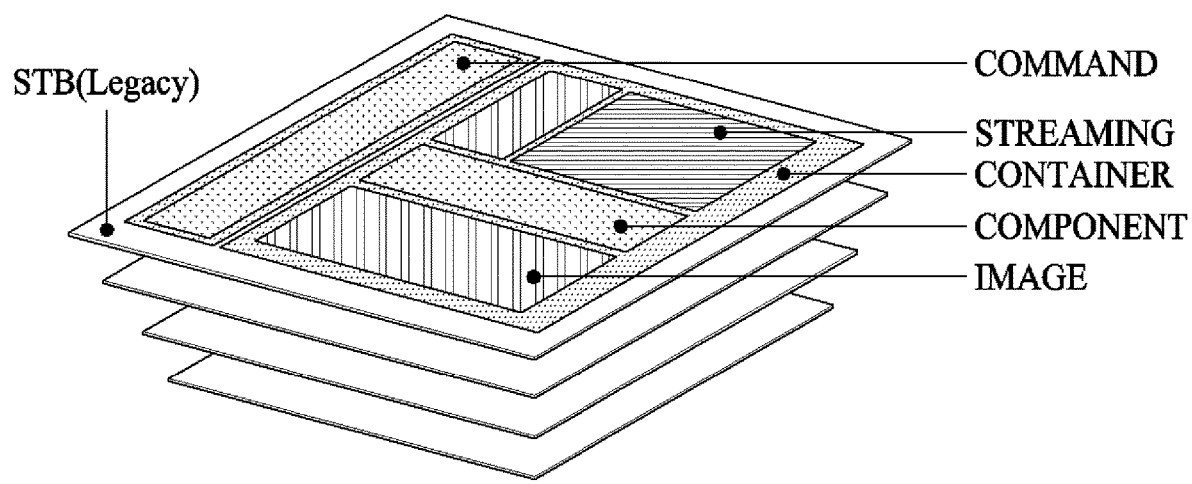
FIGS. 5A to 5E illustrate examples of a switched interaction mode according to an embodiment of the present disclosure.

Referring to FIG. 5A, a subscriber terminal device (STB, Legacy) according to an embodiment of the present disclosure includes components divided into a plurality of regions in a screen format (container), and receives a combinative UI resource formed by blending at least one of a content resource and a UI resource based on various interaction modes (command, image, streaming) according to each of the components and performs rendering.

More particularly, the remote application server according to an embodiment of the present disclosure may determines an interaction mode in a control command manner (COMMAND), an image transmission manner (IMAGE), or a streaming transmission manner according to each of the components, may determine the interaction mode in a control command manner and an image transmission manner, a control command manner and a streaming transmission manner, an image transmission manner and a streaming transmission manner, or may determine the interaction mode in all of a control command manner, an image transmission manner and a streaming transmission manner.

Accordingly, according to an embodiment of the present disclosure a subscriber terminal device may receive a combinative UI resource blended based on at least one of a control command manner, an image transmission manner, and a streaming transmission manner and may perform rendering.

Referring to FIGS. 5B to 5E, the subscriber terminal device according to an embodiment of the present disclosure receives a combinative UI resource blended based on an interaction mode switched from a remote application server and performs rendering.

Figure 5B:
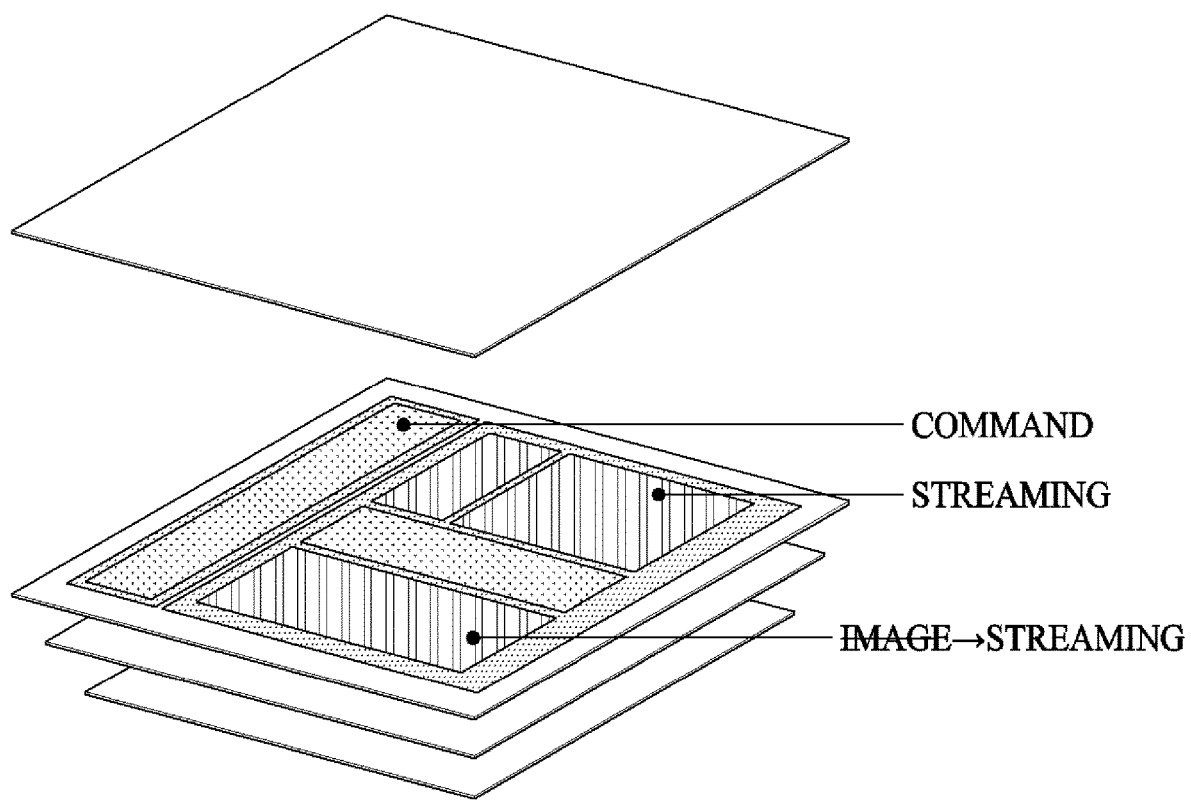

Referring to FIG. 5B, the subscriber terminal device according to an embodiment of the present disclosure may re-receive a combinative UI resource blended due to switching of a streaming transmission manner of an interaction mode received from a remote application server and perform rendering, in a process of rendering content resource and a UI resource according to an image transmission manner of the interaction mode received from the remote application server.

Accordingly, the subscriber terminal device according to an embodiment of the present disclosure performs rendering of a combinative UI resource received based on a control command manner and streaming transmission manner of an interaction mode received from a remote application server and resources (content resource and UI resource) received from a media storage.

Figure 5C:
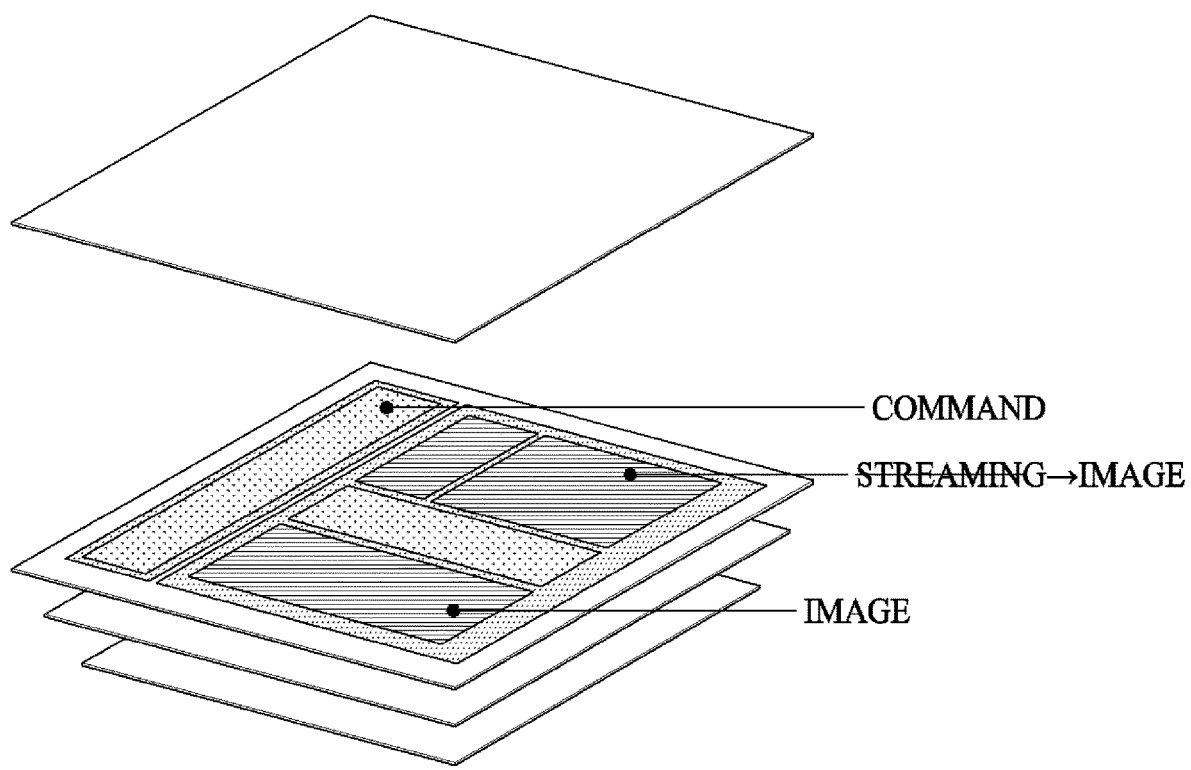

In addition, referring to FIG. 5C, the subscriber terminal device according to an embodiment of the present disclosure may re-receive a combinative UI resource blended due to switching of an image transmission manner of an interaction mode received from a remote application server and perform rendering, in a process of rendering a combinative UI resource blended according to a streaming transmission manner of the interaction mode received from the remote application server.

Accordingly, the subscriber terminal device according to an embodiment of the present disclosure performs rendering of resources (content resource and UI resource) received from a media storage based on a control command manner and image transmission manner of an interaction mode received from a remote application server.

Figure 5D:
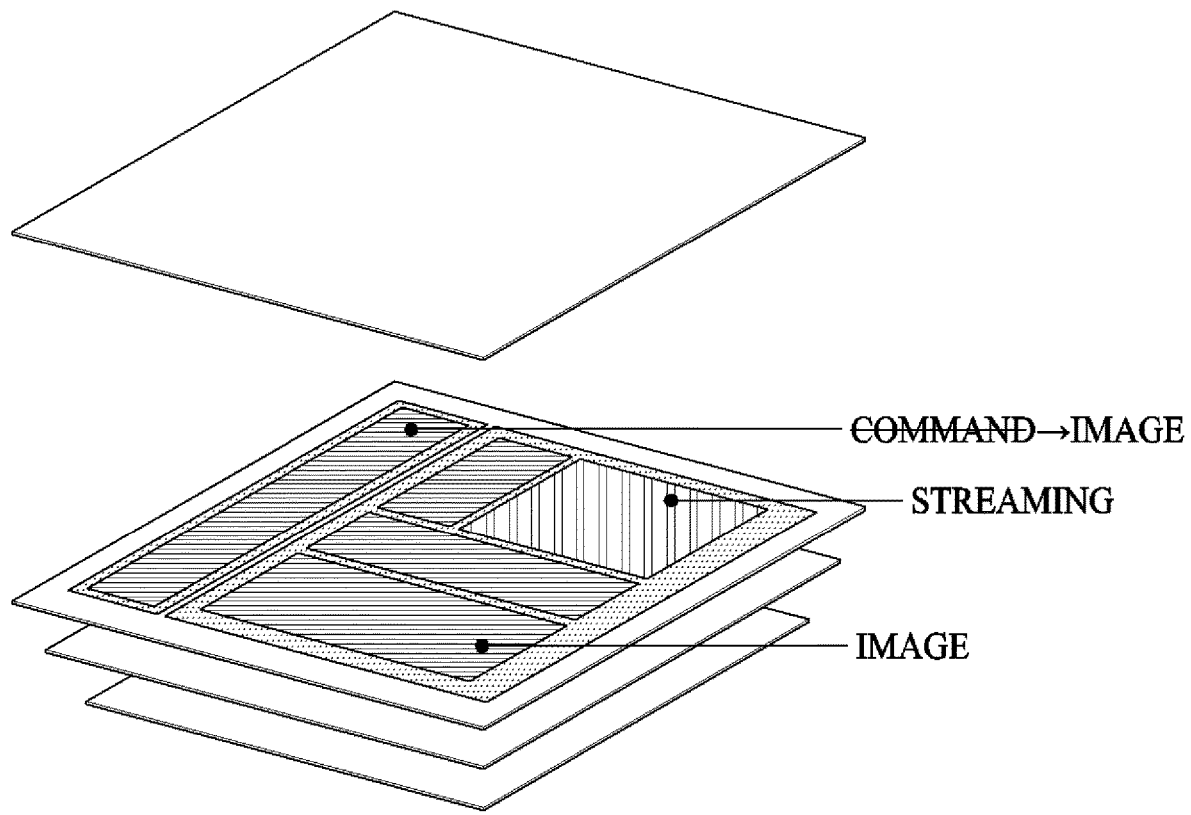

In addition, referring to FIG. 5D, the subscriber terminal device according to an embodiment of the present disclosure may re-receive a combinative UI resource blended due to switching of an image transmission manner of an interaction mode received from a remote application server and may perform rendering, in a process of rendering at least one of a content resource and a UI resource received from a media storage according to a control command manner of the interaction mode received from the remote application server.

Accordingly, the subscriber terminal device according to an embodiment of the present disclosure performs rendering of a combinative UI resource blended based on an image transmission manner and a streaming transmission manner of an interaction mode received from a remote application server and resources (content resource and UI resource).

Figure 5E:
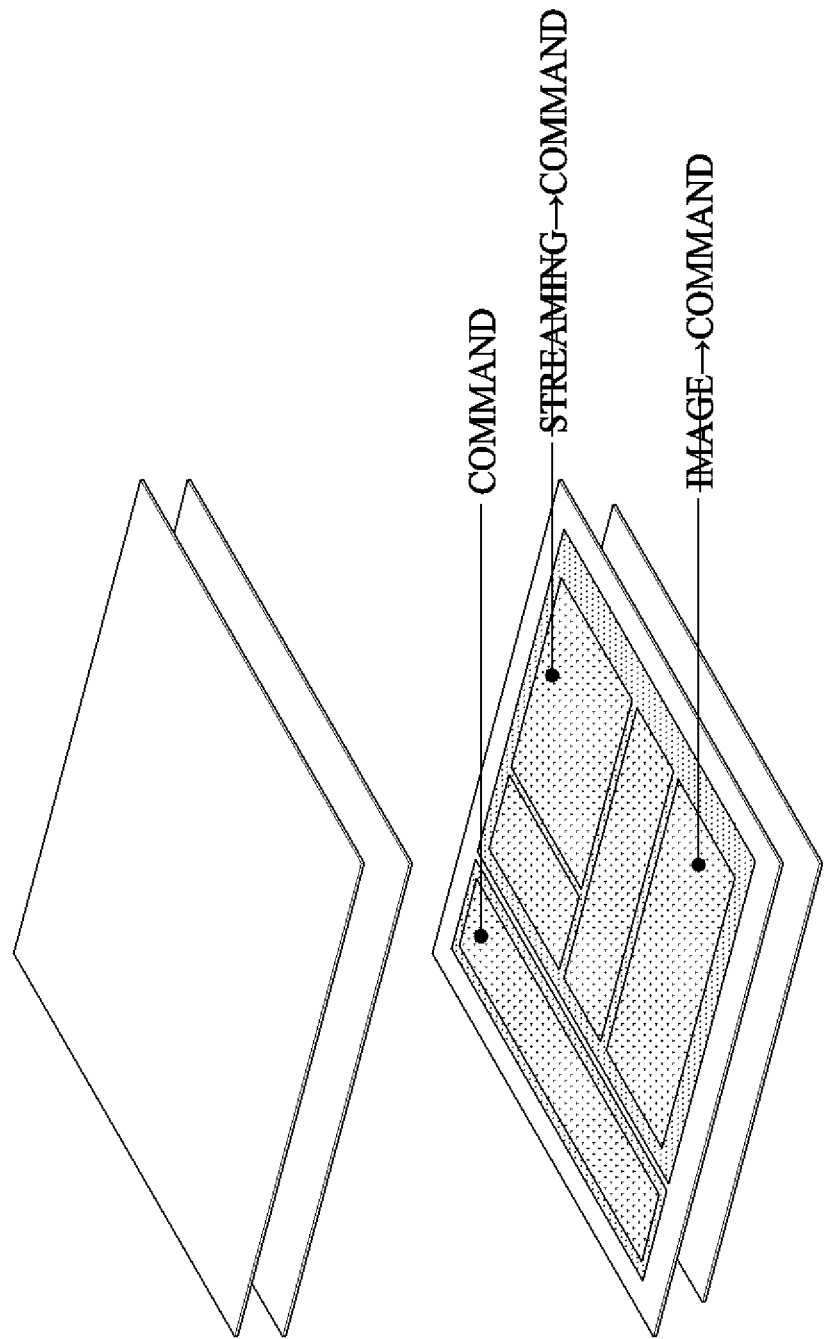

In addition, referring to FIG. 5E, the subscriber terminal device according to an embodiment of the present disclosure may request, receive, and perform rendering at least one of a content resource and a UI resource received from a media storage due to switching of a control command manner of an interaction mode received from a remote application server, in a process of receiving a combinative UI resource blended according to an image transmission manner and streaming transmission manner of the interaction mode received from the remote application server and rendering in a preset region.

Accordingly, the subscriber terminal device according to an embodiment of the present disclosure performs rendering of resources (content resource and UI resource) received from a media storage only using a control command manner of an interaction mode received from a remote application server.

The switching of the interaction mode, as described above, is performed by determination and control of a remote application server, and when a change occurs in at least one of status information and a customization service or a change occurs in resource specification information including at least one of a capacity, speed, version, and error presence or absence of at least one of a content resource and a UI resource requested by the subscriber terminal device, the remote application server may switch the interaction mode, may generate a consequent control command and combinative UI resource, and may transmit the same to the subscriber terminal device.

Figure 6:
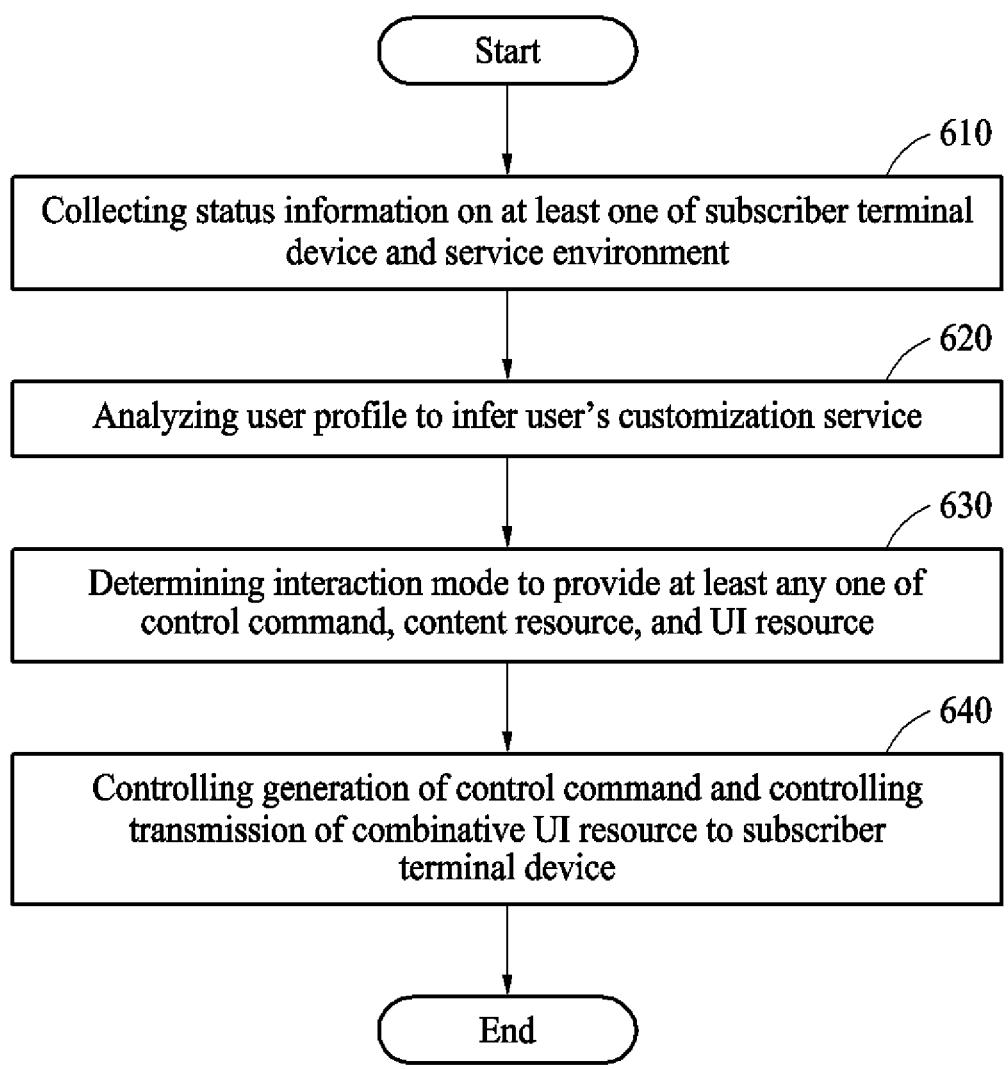
FIG. 6 is a flowchart illustrating a process of providing UIs through a remote application server in a system for providing hybrid UIs according to an embodiment of the present disclosure.

FIG. 6 is a flowchart illustrating a process of providing UIs through a remote application server in the system for providing hybrid UIs according to an embodiment of the present disclosure.

Referring to FIG. 6, in step 610, status information on at least one of a subscriber terminal device and a service environment is collected.

The status information may be information related to a subscriber terminal device such that the subscriber terminal device can perform a specific function by a control command from a remote application server.

According to an embodiment, the status information may include specification information on processing capability for at least one of decoding, screen format configuration, and overlay processing of image data of the subscriber terminal device.

Step 610 may be a step of transmitting a status information request signal to the subscriber terminal device through a network and receiving status information from the subscriber terminal device in correspondence with the transmitted status information request signal so as to collect the status information of the subscriber terminal device.

Accordingly, in step 610, status information on a service environment of the network may be collected from the status information received from the subscriber terminal device.

In step 620, a user profile is analyzed to infer a user's customization service.

For example, step 620 may be a step of analyzing a user profile including at least one of a viewing time of a user, a function usage time, and a content usage history, combining suitable services, and inferring a customization service.

In step 630, an interaction mode for provision of at least one of a control command, a content resource, and a UI resource to the subscriber terminal device is determined based on at least one of collected status information and inferred customization service.

Step 630 may be a step of determining any one interaction mode of a control command for provision of at least one of a content resource and a UI resource, an image transmission manner, and a streaming transmission manner.

In step 640, generation of a control command for requesting transmission of at least one of a content resource and a UI resource to a media storage is controlled based on the determined interaction mode, and transmission of a combinative UI resource formed by blending at least one of the content resource and the UI resource to the subscriber terminal device is controlled.

Step 640 may be a step of receiving a content resource received from a content storage and a UI resource received from a UI resource storage to generate a combinative UI resource blended based on the determined interaction mode.

The UI resource may be implemented using at least one of a web page, a bitmap for an application, and a graphic primitive for an application.

The content resource may be implemented by at least one of video content, audio content, a real-time TV broadcast program, on-demand program SNS information, a chat message, a product, and an application.

Figure 7:
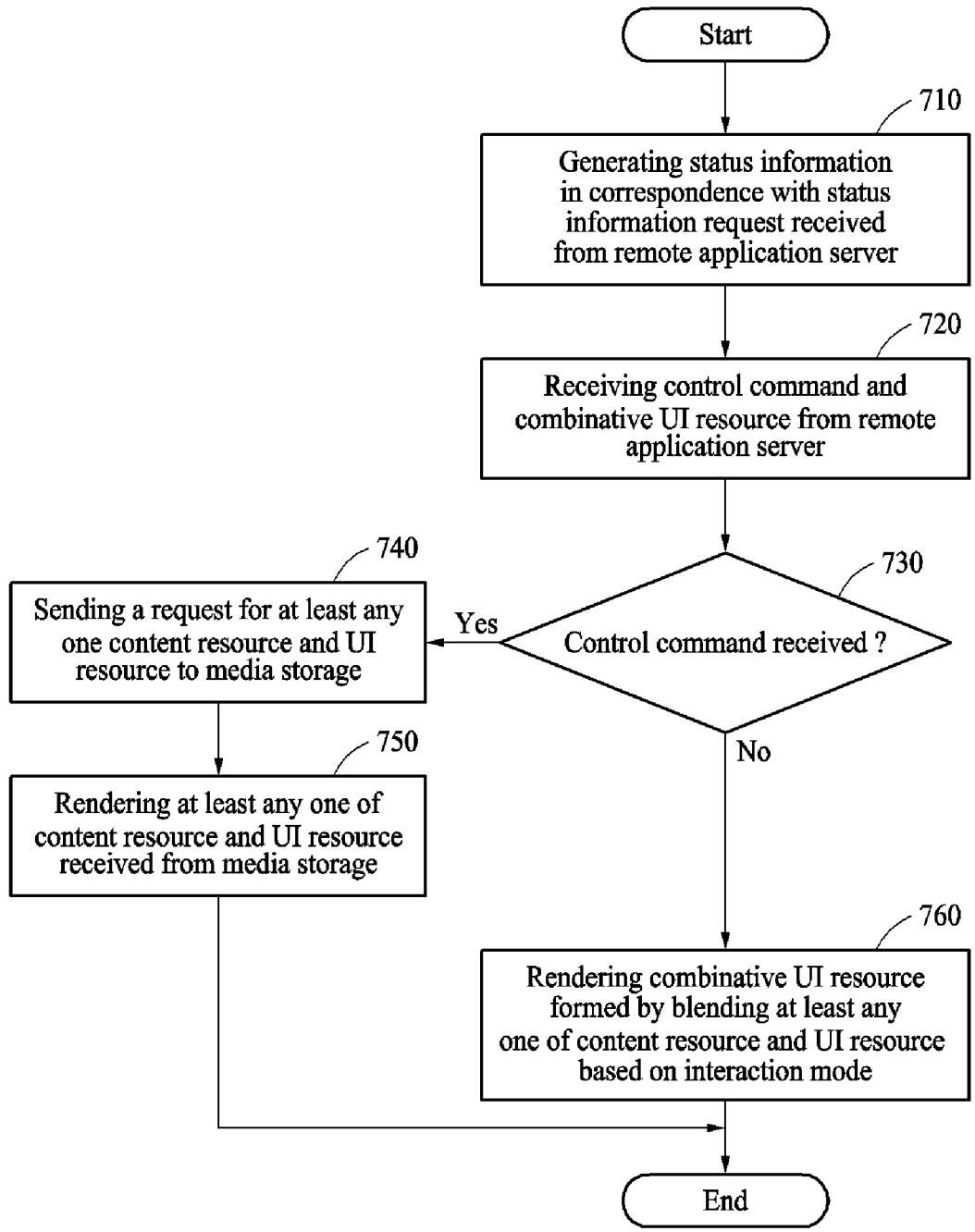
FIG. 7 is a flowchart illustrating a process of providing UIs through a subscriber terminal device in a system for providing hybrid UIs according to an embodiment of the present disclosure.

FIG. 7 is a flowchart illustrating a process of providing UIs through a subscriber terminal device in the system for providing hybrid UIs according to an embodiment of the present disclosure.

Referring to FIG. 7, in step 710, status information is generated in correspondence with a status information request received from a remote application server.

The status information may include information on a state of waiting for a control command from an application server to perform a function of a subscriber terminal device such as a content reception standby state or a state requiring processing of user input.

In addition, the status information may include processing capability information on at least one of decoding of a subscriber terminal device, screen format configuration, and overlay processing of image data.

In step 720, a control command and a combinative UI resource are received from a remote application server.

Here, in step 730, whether a control command is received from the remote application server is determined.

When the control command has been received from the remote application server in step 730, transmission of at least one of a content resource and a UI resource to a media storage is requested in step 740.

Subsequently, in step 750, rendering of the at least one of the content resource and the UI resource received from the media storage is performed.

The UI resource may be implemented using at least one of a web page, a bitmap for an application, and a graphic primitive for an application.

According to an embodiment, the UI resource may include a user interface receiving input of a user command for controlling a business service and a subscriber terminal device from the outside.

A media storage including a content storage may store and maintain content such as video content, audio content, a real-time TV broadcast program, an on-demand program, SNS information, a chat message, a product, and an application.

According to an embodiment, the media storage may store content of a format corresponding to a specific protocol such as an MPEG-2 transport packet, MPEG-4, or DVB or content to which a specific protocol is not applied.

On the other hand, when a control command has not been received from a remote application server in step 730, rendering of a combinative UI resource formed by blending at least one of a content resource and a UI resource may be performed based on an interaction mode in step 760.

Step 760 may be a step of receiving a combinative UI resource formed by blending at least one of a content resource and a UI resource based on an interaction mode of an image transmission manner and a streaming transmission manner based on at least one of status information and a customization service in a remote application server and performing rendering.

As apparent from the above description, in accordance with the present invention, cost reduction in developing an application directly related to introduction of a new services or service experience of customers may be accomplished by receiving a content resource and a UI resource to a subscriber terminal device from a storage separated from a remote application server according to a control command of a remote application server and rendering the content resource and the UI resource.

In addition, in accordance with the present invention, stable and sustainable UIs may be provided through flexible correspondence according to an environment by organically combining status information according to a subscriber terminal device and a service environment in a remote application server and suitable interaction modes corresponding to various content resources and UI resources through analysis of a user profile.

In addition, in accordance with the present invention, a resource may be saved through real-time traffic management and redistribution by determining a suitable interaction mode according to an environment in a remote application server and providing a combinative UI resource that is formed by blending at least one of a consequent content resource and UI resource.

In addition, in accordance with the present invention, real-time monitoring correspondence according to UIs may be provided based on status information collected from a subscriber terminal device and a user profile in a remote application server.

In addition, in accordance with the present invention, a combinative UI resource blended according to an interaction mode determined based on a specification of a subscriber terminal device in a remote application server may be provided, thereby significantly reducing a load of the subscriber terminal device.

In addition, in accordance with the present invention, consistent UIs may be provided to a subscriber device without development, porting, and test of applications for different STB types having different specifications, thereby allowing rapid service launch and increased customer satisfaction.

Further, in accordance with the present invention, UIs capable of being implemented even in a low-performance subscriber terminal device may be provided, thereby reducing subscriber terminal device purchase cost and service development cost.

Embodiments of the present invention can include a computer readable medium including program commands for executing operations implemented through various computers. The computer readable medium can store program commands, data files, data structures or combinations thereof. The program commands recorded in the medium may be specially designed and configured for the present invention or be known to those skilled in the field of computer software. Examples of a computer readable recording medium include magnetic media such as hard disks, floppy disks and magnetic tapes, optical media such as CD-ROMs and DVDs, magneto-optical media such as floptical disks, or hardware devices such as ROMs, RAMs and flash memories, which are specially configured to store and execute program commands. Examples of the program commands include a machine language code created by a compiler and a high-level language code executable by a computer using an interpreter and the like. The hardware devices may be configured to operate as one or more software modules to perform the operations of the embodiments, and vice versa.

Although the present invention has been described through limited embodiments and figures, the present invention is not intended to be limited to the embodiments. Those skilled in the art will appreciate that various modifications, additions and substitutions are possible, without departing from the scope and spirit of the invention. For example, although the described techniques are performed in a different order from the described method, and/or constituents, such as the described systems, structures, devices, and circuits, are combined in different manners and forms from the described method or substituted or replaced by other constituents or equivalents, appropriate results can be achieved.

It should be understood, therefore, that there is no intent to limit the invention to the embodiments disclosed, rather, the invention is to cover all modifications, equivalents, and alternatives falling within the spirit and scope of the invention as defined by the claims.

What is claimed is:

1. A remote application server, comprising:
a memory configured to store computer-readable instructions; and
one or more processors configured to execute the computer-readable instructions,
wherein the one or more processors are configured to,
collect status information on at least one of a subscriber terminal device and a service environment,
analyze a user profile to infer a user's customization service,
determine an interaction mode for provision of at least one of a control command, a content resource, and a user interface (UI) resource to the subscriber terminal device based on at least one of the collected status information and the inferred customization service,
generate the control command for controlling a rendering of at least one of the content resource and the UI resource at the subscriber terminal device based on the determined interaction mode, and
transmit the control command and a combinative UI resource formed by blending at least one of the content resource and the UI resource to the subscriber terminal device,
wherein the control command enables the subscriber terminal device to request a media storage for at least one of the content resource and the UI resource, the media storage being separated from the remote application server,
wherein the one or more processors switch the interaction mode when a change occurs in at least one of status information and a customization service or a change occurs in resource specification information including at least one of a capacity, speed, version, and error presence or absence of at least one of a content resource and a UI resource requested by the subscriber terminal device,
wherein the one or more processors transmit an image-based combinative UI resource based on the determined interaction mode, divide a screen into a plurality of regions based on the collected status information, transmit the combinative UI resource blended based on the determined interaction mode corresponding to each of the divided regions, collect a change in at least one of the status information and the inferred customization service to determine the interaction mode, switch the interaction mode from the determination result of each of the divided regions, and transmit the combinative UI resource blended based on the switched interaction mode.

2. The remote application server according to claim 1, wherein the one or more processors analyzes the user profile comprising at least one of a viewing time of a user, a function usage time, and a content usage history to combine a plurality of suitable services and infer the customization service, and determine provision of the combinative UI resource based on the inferred customization service.

3. The remote application server according to claim 2, wherein the customization service is formed by combining a plurality of services, classified according to levels, for the viewing time, the function usage time, and the content usage history.

4. The remote application server according to claim 1, wherein the one or more processors control a streaming-based combinative UI resource to be streamed to the subscriber terminal device based on the determined interaction mode.

5. The remote application server according to claim 4, wherein the streaming-based combinative UI resource is formed by blending at least one of the content resource and the UI resource, and the one or more processors encode the streaming-based combinative UI resource and control the encoded streaming-based combinative UI resource to be streamed to the subscriber terminal device.

6. The remote application server according to claim 5, wherein the subscriber terminal device decodes the streamed combinative UI resource and performs rendering.

7. The remote application server according to claim 1, wherein the subscriber terminal device receives the image-based combinative UI resource to perform rendering.

8. The remote application server according to claim 1, wherein the subscriber terminal device receives the blended combinative UI resource based on the switched interaction mode to perform rendering in correspondence with the regions.

9. The remote application server according to claim 1, wherein the status information comprises processing capability information on at least one of decoding of the subscriber terminal device, screen format configuration, and overlay processing of image data.

10. The remote application server according to claim 1, wherein the status information comprises at least one of resolution information on a display device interworking with the subscriber terminal device, display screen rotation information, device information on an input device interworking with the subscriber terminal device, and service subscription information, and
the subscriber terminal device generates the status information in correspondence with a status information request received from a status information collector and transmits the generated status information to the status information collector.

11. The remote application server according to claim 1, wherein the UI resource is implemented using at least one of a web page, a bitmap for an application, and a graphic primitive for an application,
wherein the content resource is implemented by at least one of video content, audio content, a real-time TV broadcast program, on-demand program SNS information, a chat message, a product, and an application.

12. The remote application server according to claim 10, wherein the status information collector collects status information on service environments of network from the status information received from the subscriber terminal device,
wherein the service environments of network include network latency and congestion status in a data reception process based on the status information received from the subscriber terminal device.

13. A subscriber terminal device, comprising:
a memory configured to store computer-readable instructions; and
one or more processors configured to execute the computer-readable instructions such that the one or more processors are configured to
generate status information in correspondence with a status information request received from a remote application server,
request at least one of a content resource and a user interface (UI) resource to a media storage based on a control command received from the remote application server,
receive at least one of the content resource and the UI resource from the media storage in correspondence with the request, and
render the at least one of the content resource and the UI resource received from the media storage,
wherein the media storage is separate from the remote application server, and a combinative UI resource is formed by blending at least one of a content resource and a UI resource based on an interaction mode received from the remote application server,
wherein the remote application server switches the interaction mode when a change occurs in at least one of status information and inferred customization service or a change occurs in resource specification information including at least one of a capacity, speed, version, and error presence or absence of at least one of the content resource and a UI resource requested by the subscriber terminal device,
wherein the remote application server transmits an image-based combinative UI resource based on the interaction mode, divides a screen into a plurality of regions based on the status information, transmit the combinative UI resource blended based on the interaction mode corresponding to each of the divided regions, collects a change in at least one of the status information and the inferred customization service to determine the interaction mode, switches the interaction mode from the determination result of each of the divided regions, and transmits the combinative UI resource blended based on the switched interaction mode.

14. The subscriber terminal device according to claim 13, wherein the one or more processors control such that at least one of the blended combinative UI resource and the content resource and UI resource received from the media storage is rendered in correspondence with a screen divided into a plurality of regions.

15. The subscriber terminal device according to claim 13, wherein the one or more processors generate the status information corresponding to a user input received through an input device.

16. A method of providing hybrid user interfaces (UIs), the method comprising:
collecting status information on at least one of a subscriber terminal device and a service environment;
analyzing a user profile to infer a user's customization service;
determining an interaction mode for provision of at least one of a control command, a content resource, and a UI resource to the subscriber terminal device based on at least one of the collected status information and the inferred customization service;

generating the control command controlling a rendering of at least one of the content resource and the UI resource at the subscriber terminal device based on the determined interaction mode;

transmitting a combinative UI resource formed by blending at least one of a content resource and a UI resource and the control command to the subscriber terminal device; and switching the interaction mode when a change occurs in at least one of status information and the inferred customization service or a change occurs in resource specification information including at least one of a capacity, speed, version, and error presence or absence of at least one of the content resource and a UI resource requested by the subscriber terminal device, wherein the control command enables the subscriber terminal device to request a media storage for at least one of the content resource and the UI resource, the media storage being separated from the remote application server, wherein the transmitting the combinative UI resource to the subscriber terminal device further comprises:

transmitting an image-based combinative UI resource based on the determined interaction mode;

dividing a screen into a plurality of regions based on the collected status information;

transmitting the combinative UI resource blended based on the determined interaction mode corresponding to each of the divided regions;

collecting a change in at least one of the status information and the inferred customization service to determine the interaction mode;

switching the interaction mode from the determination result of each of the divided regions; and transmitting the combinative UI resource blended based on the switched interaction mode.

17. A computer program stored in a non-transitory computer readable recording medium to implement the method according to claim 16.

* * * * *